(12) United States Patent
Omata et al.

(10) Patent No.: US 8,320,714 B2
(45) Date of Patent: Nov. 27, 2012

(54) IMAGE PROCESSING APPARATUS, COMPUTER-READABLE RECORDING MEDIUM FOR RECORDING IMAGE PROCESSING PROGRAM, AND IMAGE PROCESSING METHOD

(75) Inventors: Yoshinobu Omata, Hachioji (JP); Hiroshi Sasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 413 days.

(21) Appl. No.: 12/633,221

(22) Filed: Dec. 8, 2009

(65) Prior Publication Data
US 2010/0086202 A1 Apr. 8, 2010

Related U.S. Application Data

(63) Continuation of application No. PCT/JP2008/060369, filed on Jun. 5, 2008.

(30) Foreign Application Priority Data

Jun. 13, 2007 (JP) ................................. 2007-156692

(51) Int. Cl.
*G06K 9/32* (2006.01)
(52) U.S. Cl. ........................................ 382/300; 348/272
(58) Field of Classification Search ........................ None
See application file for complete search history.

(56) References Cited

U.S. PATENT DOCUMENTS

| | | | | |
|---|---|---|---|---|
| 5,382,976 A * | 1/1995 | Hibbard | ........................ | 348/273 |
| 6,853,748 B2 * | 2/2005 | Endo et al. | ..................... | 382/167 |
| 6,888,568 B1 * | 5/2005 | Neter | ........................ | 348/222.1 |
| 7,016,549 B1 * | 3/2006 | Utagawa | ........................ | 382/261 |
| 7,391,903 B2 * | 6/2008 | Ishiga | ........................ | 382/167 |
| 7,688,368 B2 * | 3/2010 | Kijima et al. | ..................... | 348/272 |
| 8,018,501 B2 * | 9/2011 | Sasaki | ........................ | 348/223.1 |
| 2002/0044778 A1 * | 4/2002 | Suzuki | ........................ | 396/429 |
| 2003/0231247 A1 * | 12/2003 | Watanabe | ..................... | 348/222.1 |
| 2004/0032419 A1 | 2/2004 | Zhou et al. | | |
| 2004/0080639 A1 * | 4/2004 | Ishiga | ........................ | 348/272 |
| 2004/0165082 A1 | 8/2004 | Takai | | |
| 2005/0201616 A1 * | 9/2005 | Malvar et al. | ................. | 382/167 |
| 2006/0092298 A1 * | 5/2006 | Ishiga | ........................ | 348/272 |
| 2006/0132628 A1 | 6/2006 | Suzuki | | |
| 2006/0244842 A1 * | 11/2006 | Hatano | ........................ | 348/223.1 |
| 2009/0115870 A1 * | 5/2009 | Sasaki | ........................ | 348/223.1 |

FOREIGN PATENT DOCUMENTS

| | | |
|---|---|---|
| EP | 1 187 455 A2 | 3/2002 |
| JP | 11-243554 A | 9/1999 |
| JP | 2000-217123 A | 8/2000 |
| JP | 2002-016930 A | 1/2002 |
| JP | 2002-084547 A | 3/2002 |
| JP | 2003-235052 A | 8/2003 |
| JP | 2004-512580 A | 4/2004 |
| JP | 2004-193911 A | 7/2004 |
| WO | WO 02/03688 A2 | 1/2002 |

* cited by examiner

*Primary Examiner* — Chan S Park
*Assistant Examiner* — Sean Motsinger
(74) *Attorney, Agent, or Firm* — Holtz, Holtz, Goodman & Chick, PC

(57) ABSTRACT

An image processing apparatus includes: a color difference calculating unit for generating an (R−G)G(B−G) Bayer array image from an RGB Bayer array image; a band-limited interpolation unit for interpolating a sampling position whose number is smaller than the number of U pixel to obtain an equal number of interpolation (R−G), G, and (B−G) pixels from the (R−G)G(B−G) Bayer array image: and an RGB calculating unit for obtaining interpolation R, G and B pixels which constitute a color image with the sampling position where R, G and B pixels coincide, based on the obtained interpolation (R−G), G, and (B−G) pixels.

13 Claims, 14 Drawing Sheets

| Rs | Gs | Rs | Gs | Rs | Gs |
| --- | --- | --- | --- | --- | --- |
| Gs | Bs | Gs | Bs | Gs | Bs |
| Rs | Gs | Rs | Gs | Rs | Gs |
| Gs | Bs | Gs | Bs | Gs | Bs |
| Rs | Gs | Rs | Gs | Rs | Gs |
| Gs | Bs | Gs | Bs | Gs | Bs |

FIG.7
| R-Gi | Gs | R-Gi | Gs | R-Gi | Gs |
|------|------|------|------|------|------|
| Gs | B-Gi | Gs | B-Gi | Gs | B-Gi |
| R-Gi | Gs | R-Gi | Gs | R-Gi | Gs |
| Gs | B-Gi | Gs | B-Gi | Gs | B-Gi |
| R-Gi | Gs | R-Gi | Gs | R-Gi | Gs |
| Gs | B-Gi | Gs | B-Gi | Gs | B-Gi |
FIG.8
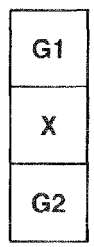
FIG.9
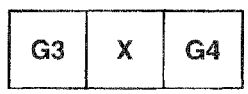
FIG.10
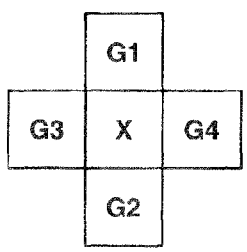

FIG.11

| X-Gv (k-2,l-2) | | X-Gv (k,l-2) | | X-Gv (k+2,l-2) |
|---|---|---|---|---|
| | | | | |
| X-Gv (k-2,l) | | X-Gv (k,l) | | X-Gv (k+2,l) |
| | | | | |
| X-Gv (k-2,l+2) | | X-Gv (k,l+2) | | X-Gv (k+2,l+2) |

FIG.12

| X-Gh (k-2,l-2) | | X-Gh (k,l-2) | | X-Gh (k+2,l-2) |
|---|---|---|---|---|
| | | | | |
| X-Gh (k-2,l) | | X-Gh (k,l) | | X-Gh (k+2,l) |
| | | | | |
| X-Gh (k-2,l+2) | | X-Gh (k,l+2) | | X-Gh (k+2,l+2) |

FIG.13

| X-Ga (k-2,l-2) | | X-Ga (k,l-2) | | X-Ga (k+2,l-2) |
|---|---|---|---|---|
| | | | | |
| X-Ga (k-2,l) | | X-Ga (k,l) | | X-Ga (k+2,l) |
| | | | | |
| X-Ga (k-2,l+2) | | X-Ga (k,l+2) | | X-Ga (k+2,l+2) |

| X-Gd (k-2,l-2) | | X-Gd (k,l-2) | | X-Gd (k+2,l-2) |
|---|---|---|---|---|
| | | | | |
| X-Gd (k-2,l) | | X-Gd (k,l) | | X-Gd (k+2,l) |
| | | | | |
| X-Gd (k-2,l+2) | | X-Gd (k,l+2) | | X-Gd (k+2,l+2) |

# IMAGE PROCESSING APPARATUS, COMPUTER-READABLE RECORDING MEDIUM FOR RECORDING IMAGE PROCESSING PROGRAM, AND IMAGE PROCESSING METHOD

CROSS REFERENCE TO RELATED APPLICATION

This application is a continuation application of PCT/JP2008/060369 filed on Jun. 5, 2008 and claims benefit of Japanese Patent Application No. 2007-156692 filed in Japan on Jun. 13, 2007, the entire contents of which are incorporated herein by this reference.

BACKGROUND OF INVENTION

1. Field of the Invention

The present invention relates to an image processing apparatus, a computer-readable recording medium for recording an image processing program, and an image processing method, and the image processing apparatus, the image processing program, and the image processing method are for generating a color image with sampling positions where R, G and B pixels coincide from an RGB Bayer array image.

2. Description of the Related Art

With the progress in digital instruments and the spread of personal computers, digital cameras have come into wide use as simple image inputting means.

FIG. 21 is a block diagram showing an exemplary configuration of a conventional digital camera. The digital camera has an image pickup unit. The image pickup unit includes: an optical system 2101 that forms an optical image of a subject; an image pickup device 2102 that photoelectrically converts the optical image formed by the optical system 2101 to generate an electric image signal; a pre-processing unit 2103 that performs analog pre-processing such as gradation conversion processing and white balance processing on the image signal outputted from the image pickup device 2102; and an A/D conversion unit 2104 that converts an analog signal outputted from the pre-processing unit 2103 into digital data.

The digital camera further includes: an interpolation processing unit 2105 that receives digital image data from the A/D conversion unit 2104 and performs interpolation processing; a size conversion unit 2106 that changes the size of the image subjected to the interpolation processing; a Y/C: conversion unit 2107 that converts the image data whose size has been changed into a luminance signal and color difference signals; and a compressing/recording unit 2108 that performs compression processing using the JPEG (Joint Photographic Coding Experts Group) method, for example, to record the image data which has been converted into the luminance signal and the color difference signals.

The JPEG method is a compression method generally used in digital cameras when compressing images. Note that, in the JPEG method, compression processing is generally performed after an RGB signal was converted into a luminance signal and color difference signals.

Furthermore, the digital camera includes a control unit, not shown, that performs control of the digital camera including photographing operation by the optical system 2101 and the pre-processing operation by the pre-processing unit 2103.

The above-described digital camera is shown as an exemplary configuration of what is called a consumer digital camera. The consumer digital camera generally uses a single-plate image pickup device. Specifically, for example, a primary color Bayer pattern single-plate image pickup device is used as the image pickup device 2102. The primary color Bayer pattern single-plate image pickup device includes red (R), blue (B) and green (G) filters arranged in a mosaic pattern as shown in FIG. 6 related to an embodiment of the present invention, and only data of one of the red, green and blue colors can be obtained at each pixel and the other two colors are missing.

Since data of all the three primary colors are needed for each pixel position to create a color image, the missing color components at each pixel are interpolated from surrounding pixels by the interpolation processing unit 2105 after image pickup.

When such interpolation processing is performed to interpolate the missing color components from surrounding pixels, there is a possibility that the color of the interpolated position differs from the original color. As a result, there is a problem that what is called a false color easily occurs.

Generation of a false signal tends to be more remarkable in the color difference signals Cr, Cb than in the luminance signal Y. The luminance signal Y and the color difference signals Cr, Cb are calculated as shown in the following equations based on an RGB signal.

$$Y = 0.29900 \times R + 0.58700 \times G + 0.11400 \times B$$

$$Cb = -0.16874 \times R - 0.33126 \times G + 0.50000 \times B$$

$$Cr = 0.50000 \times R - 0.41869 \times G - 0.08131 \times B$$

As is known from these equations, the ratio of G signals is high in the Y signal, the ratio of B signals is high in the Cb signal, and the ratio of R signals is high in the Cr signal. Incidentally, in primary color Bayer pattern image pickup devices, the ratio of the number of pixels of the three colors is expressed as follows, red (R):green (G):blue (B)=1:2:1. When data obtained by a Bayer array image pickup device is interpolated to generate an RGB signal, error due to the interpolation tends to become larger in the R signals and the B signals which have small number of pixels than in the G signals. Accordingly, the error becomes larger in the color difference signal Cb in which the ratio of B signals is high and the color difference signal Cr in which the ratio of R signals is high than in the luminance signal Y.

When, in particular, a still image is picked up by a digital camera, false color has a significant influence on an image quality, so that there is a need to suppress generation of the false color. Such technology is disclosed, for example, in Japanese Patent Application Laid-Open Publication No. 11-243554 as an interpolation method for suppressing generation of false color and in Japanese Patent Application Laid-Open Publication No. 2000-217123 as a false color reducing method using a Median filter. However, the technologies disclosed in the Japanese Patent Application Laid-Open Publication Nos. 11-243554 and 2000-217123 have such a problem that the circuit scale is increased when building hardware.

As a technology for generating pixels each containing three primary colors while preventing an increase in circuit scale, Japanese Patent Application Laid-Open Publication No, 2003-235052, for example, discloses a technology for creating one colored pixel from four pixels (2×2 pixels) arranged in Bayer array, as shown in FIG. 22. FIG. 22 is a view showing a part of an image photographed by a primary color Bayer pattern image pickup device. In the technology, pixel values of pixels $R_s$, $G_s$ and $B_s$ having different image-forming positions (spatial positions) on the image pickup device are processed as pixel values obtained at a pixel position of a point PA. Since the pixel $G_s$ has two pixel values, an average value of the two pixel values is used as the pixel value of G at the pixel position of the point PA. Such a technology eliminates the need for reproducing an entire image and prevents an increase in the circuit scale.

SUMMARY OF THE INVENTION

An image processing apparatus according to one aspect of the present invention includes: color difference calculating means for creating an (R−G) pixel at an R pixel position and a (B−G) pixel at a B pixel position and generating an (R−G)G(B−G) Bayer array image from an RGB Bayer array image; hand-limited interpolation means for interpolating a sampling position whose number is smaller than the number of G pixel in the RGB Bayer array image to obtain an equal number of interpolation (R−G) pixel, interpolation G pixel, and interpolation (B−G) pixel at the same sampling position from the (R−G)G(B−G) Bayer array image; and RGB calculating means for calculating an interpolation R pixel based on the interpolation (R−G) pixel and the interpolation G pixel obtained by the band-limited interpolation means, and calculating an interpolation B pixel based on the interpolation (B−G) pixel and the interpolation G pixel obtained by the band-limited interpolation means, to obtain the interpolation R pixel, the interpolation G pixel, and the interpolation B pixel constituting a color image with a sampling position where R, G, and B pixels coincide.

BRIEF DESCRIPTION OF THE DRAWINGS

FIG. 7 is a diagram illustrating a two-dimensional array of color difference signals and $G_s$ signals outputted from the color difference calculating unit according to the first embodiment.

FIG. 8 is a diagram illustrating positions on the Bayer array of adjacent G signals in the up and down directions used for vertical direction interpolation of missing G signal positions in the first embodiment.

FIG. 9 is a diagram illustrating positions on the Bayer array of adjacent G signals in the left and right directions used for horizontal direction interpolation of the missing G signal positions in the first embodiment.

FIG. 10 is a diagram illustrating positions on the Bayer array of adjacent G signals in the up, down, left, and right directions used for adjacent four-pixel interpolation of the missing G signal positions in the first embodiment.

FIG. 11 is a diagram illustrating positions on the Bayer array of color difference signals used for calculating a surrounding similarity among color difference signals at missing G signal positions calculated based on the vertical direction interpolation in the first embodiment.

FIG. 12 is a diagram illustrating positions on the Bayer array of color difference signals used for calculating a surrounding similarity among color difference signals at the missing G signal positions calculated based on the horizontal direction interpolation in the first embodiment.

FIG. 13 is a diagram illustrating positions on the Bayer array of color difference signals used for calculating a surrounding similarity among color difference signals at the missing G signal positions calculated based on the adjacent four-pixel interpolation in the first embodiment.

DETAILED DESCRIPTION OF THE PREFERRED EMBODIMENTS

An image processing apparatus according to the following embodiments of the present invention is an image processing apparatus that generates a color image with a sampling position where R, G and B pixels coincide from an RGB Bayer array image in which a sampling density of G (green) pixels is higher than a sampling density of R (red) pixels and a sampling density of B (blue) pixels and in which the sampling positions of the pixels are different. Hereinafter, the embodiments of the present invention will be described with reference to the drawings.

First Embodiment

Figure 1:
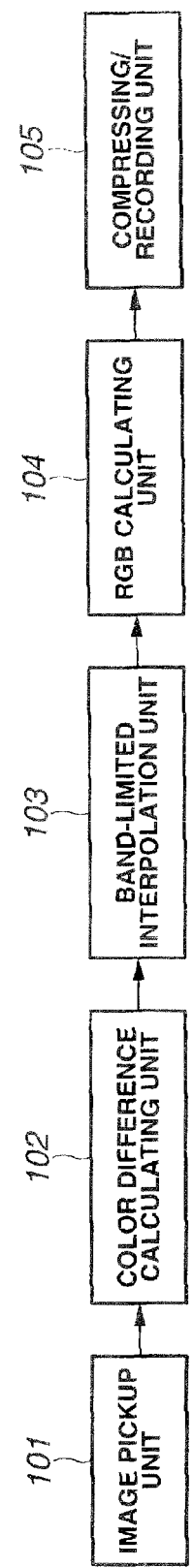
FIG. 1 is a block diagram showing an overall configuration of an image processing apparatus according to a first embodiment of the present invention.

FIGS. 1 to 14 show the first embodiment of the present invention. FIG. 1 is a block diagram of an overall configuration of an image processing apparatus.

As shown in FIG. 1, the image processing apparatus includes an image pickup unit 101, a color difference calculating unit 102, a band-limited interpolation unit 103, an RGB calculating unit 104, and a compressing/recording unit 105.

Figures 5, 6:
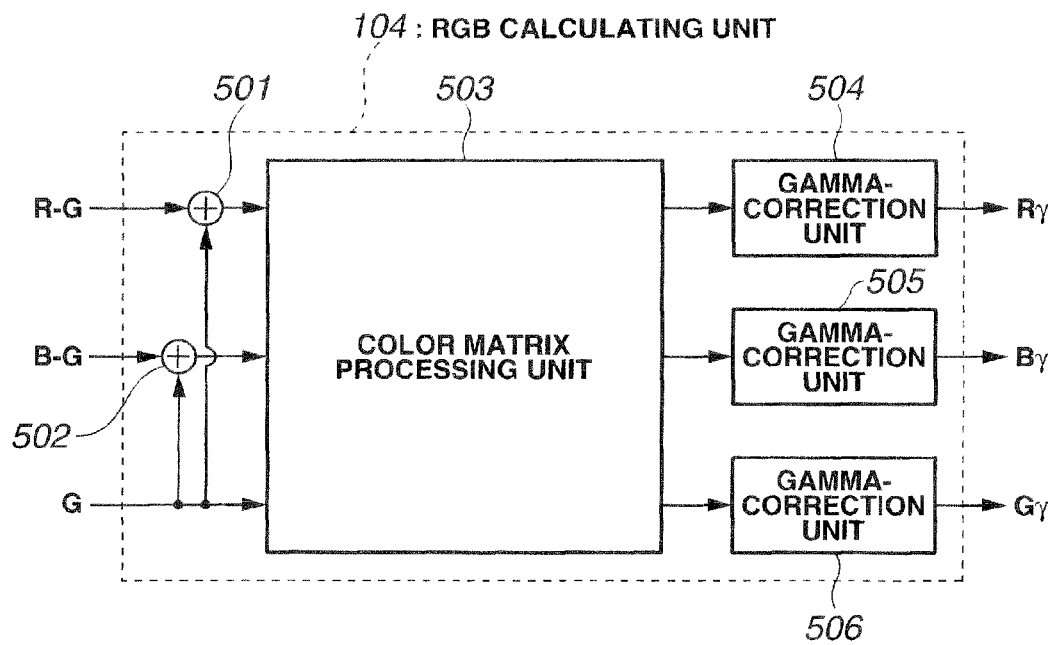
FIG. 5 is a block diagram showing a configuration of an RGB calculating unit according to the first embodiment.
FIG. 6 is a diagram illustrating a Bayer array of color signals picked up by a single-plate image pickup device in an image pickup unit according to the first embodiment.

The image pickup unit 101 is configured by including a lens, an IR cut filter, an optical low-pass filter, a single-plate image pickup device (hereinafter, simply referred to as "image pickup device"), an amplifier, an A/D converter, and an image pickup device controller, though not shown in the drawing. The lens forms an optical image of a subject on the image pickup device. The IR cut filter cuts light in infrared region from the luminous flux passing through the lens. The optical low-pass filter is an optical filter that limits a band such that a resolution of an optical image formed on the image pickup device by the lens has a spatial frequency characteristic in which moiré is not generated due to aliasing distortion in the sampling interval of G signals. The image pickup device is a single-plate image pickup device with a color filter of the Bayer array as shown in FIG. 6, and is configured of a CCD or a CMOS, for example. FIG. 6 is a diagram illustrating the Bayer array of the color signal picked up by a single-plate image pickup device in the image pickup unit 101. The amplifier amplifies the signals outputted from the image pickup device in an analog format. The A/D converter converts the analog signals amplified by the amplifier into digital signals (color signals $R_s$, $G_s$ and $B_s$). The image pickup device controller controls and drives the image pickup device for image pickup. After the image pickup, the image pickup device controller classifies the digital signals (color signals $R_s$, $G_s$ and $B_s$) outputted from the A/D converter according to the color components and outputs the classified digital signals to the color difference calculating unit 102, as described later.

The color difference calculating unit 102 calculates interpolation G pixels G, corresponding to the pixel positions of the inputted color signals $R_s$ and $B_s$ and color difference signals $R-G_i$ and $B-G_i$ at the pixel positions. The color difference calculating unit 102 outputs the G, signals and the color difference signals $R-G_i$, $B-G_i$ arranged in a two-dimensional array as shown in FIG. 7 to the band-limited interpolation unit 103 in order of the raster scanning. FIG. 7 is a diagram illustrating the two-dimensional array of the color difference signals and the $G_s$ signals outputted from the color difference calculating unit 102. The color difference calculating unit 102 will be detailed later.

In order to obtain the (R−G), G and (B−G) pixels at spatially the same position, the band-limited interpolation unit 103 performs interpolation using surrounding color differences $R-G_i$ and $B-G_i$ related to the same color or surrounding pixels G, and outputs the color differences R−G of all pixel positions, the color differences B−G of all pixel positions, and G pixels of all pixel positions to the RGB calculating unit 104.

The RGB calculating unit 104 adds the color difference signals R−G, B−G and G signals inputted from the band-limited interpolation unit 103 to calculate linear RGB signals. The RGB calculating unit 104 further applies a color matching processing and γ-correction processing to the calculated linear RGB signals to calculate Rγ, Gγ and Bγ signals, and outputs the calculated Rγ, Gγ, and Bγ signals to the compressing/recording unit 105.

The compressing/recording unit 105 converts the Rγ, Gγ and Bγ signals inputted from the RGB calculating unit 104 into Y, Cb and Cr signals, and further converts the Y, Cb and Cr signals into compressed data subjected to a high-efficiency compression encoding processing such as PEG and MPEG and saves the compressed data in a recording medium.

Figure 2:
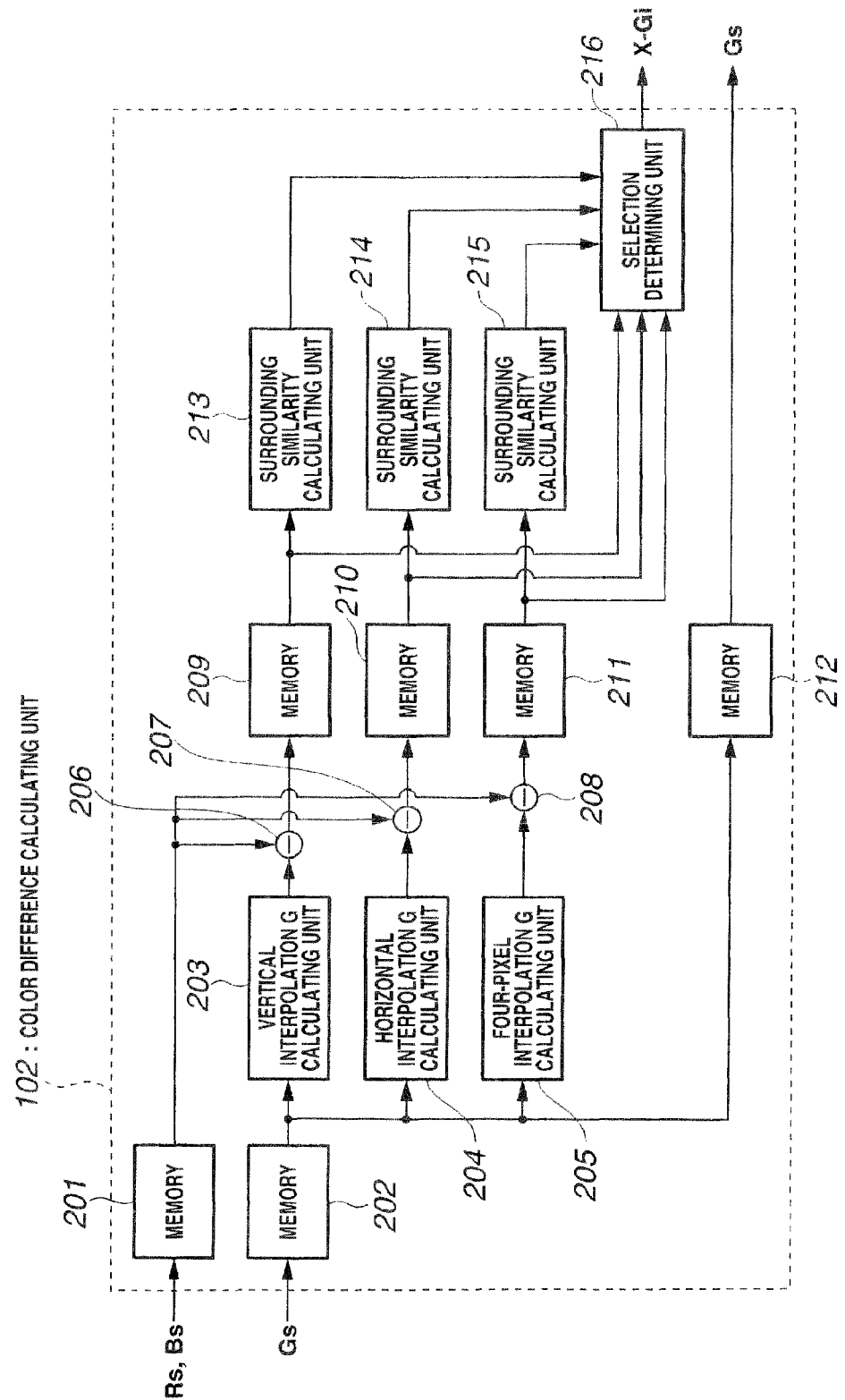
FIG. 2 is a block diagram showing a configuration of a color difference calculating unit according to the first embodiment.

Next, FIG. 2 is a block diagram showing a configuration of the color difference calculating unit 102.

The color difference calculating unit 102 includes: a memory 201; a memory 202; a vertical interpolation G calculating unit 203, a horizontal interpolation G calculating unit 204; a four-pixel interpolation G calculating unit 205; a subtracting unit 206; a subtracting unit 207; a subtracting unit 208; a memory 209; a memory 210; a memory 211; a memory 212; a surrounding similarity calculating unit 213; a surrounding similarity calculating unit 214; a surrounding similarity calculating unit 215; and selection determining unit 216.

The color signals $R_s$, $B_s$ and the color signal $G_s$ outputted from the image pickup unit 101 are stored in the memory 201 and in the memory 202, respectively, by predetermined number of lines, in order to obtain a delay until the pixels are collected enough to execute a two-dimensional interpolation processing of missing G pixel positions. In the example shown in FIG. 2, the number of lines stored in the memories 201 and 202 is at least three.

At the missing G pixel positions, R pixels or B pixels are arranged, however, the two color signals are collectively referred to as X, or X pixels in the description below.

The vertical interpolation G calculating unit 203 is color difference candidate calculating means that uses neighboring G pixels in the vertical direction as shown in FIG. 8 to calculate a G interpolation candidate based on an interpolation equation $G_v=(G_1+G_2)/2$, and outputs the calculated G interpolation candidate to the subtracting unit 206. FIG. 8 is a diagram illustrating the positions on the Bayer array of adjacent G signals in the up and down directions used for vertical direction interpolation of the missing G signal position.

The horizontal interpolation G calculating unit 204 is color difference candidate calculating means that uses neighboring G pixels in the horizontal direction as shown in FIG. 9 to calculate a G interpolation candidate based on an interpolation equation $G_h=(G_3+G_4)/2$, and outputs the calculated G interpolation candidate to the subtracting unit 207. FIG. 9 is a diagram illustrating the positions on the Bayer array of adjacent G signals in the left and right directions used for horizontal direction interpolation of the missing G signal position.

The four-pixel interpolation G calculating unit 205 is color difference candidate calculating means that uses four neighboring G pixels in the vertical and horizontal directions as shown in FIG. 10 to calculate a G interpolation candidate based on an interpolation equation $G_a=(G_1+G_2+G_3+G_4)/4$, and outputs the calculated G interpolation candidate to the subtracting unit 20g. FIG. 10 is a diagram illustrating the positions on the Bayer array of the adjacent G signals in the up, down, left, and right directions used for adjacent four-pixel interpolation of the missing G signal position.

Note that M types of G interpolation candidates are calculated and M is set to three in the present embodiment. However, the types M of the G interpolation candidates to be calculated may be an arbitrary number which is two or more.

The subtracting unit 206 is color difference candidate calculating means that receives the X pixels at the same positions as the missing G pixels from the memory 201, calculates color difference signals (color difference candidates) $X-G_v$, and outputs the calculated color difference signals to the memory 209 to store the signals therein.

The subtracting unit 207 is color difference candidate calculating means that receives the X pixels at the same positions as the missing G pixels from the memory 201, calculates color difference signals (color difference candidates) $X-G_h$, and outputs the calculated color difference signals to the memory 210 to store the signals therein.

The subtracting unit 208 is color difference candidate calculating means that receives the X pixels at the same positions as the missing G pixels from the memory 201, calculates color difference signals (color difference candidates) X–G$_a$, and outputs the calculated color difference signals to the memory 211 to store the signals therein.

Note that the color difference signals stored in the memories 209, 210 and 211 are used later by the surrounding similarity calculating units 213, 214 and 215 when calculating the surrounding similarities as correlation related values (the term "correlation related value" is used here instead of "correlation value" because a correlation value indicates high correlativity when the value is large, while the surrounding similarity indicates high correlativity when the value is small, as described later.) The surrounding similarity calculating units 213, 214 and 215 are configured to calculate the similarity of color difference signals in a neighboring area including three rows and three columns of the same-type color difference signals (i.e., color difference signals with the same type of G interpolation candidates G$_v$, G$_h$, and G$_a$ used for calculating the color difference candidates and with the same color X. Therefore, for example, R–G$_v$ and B–G$_v$ are not the same-type color difference signals, and R–G$_v$ and R–G$_h$ are not the same-type color difference signals) as shown in FIGS. 11 to 13. Accordingly, each of the memories 209, 210, and 211 can store at least five lines of data to obtain a delay that allows each of the surrounding similarity calculating units 213, 214 and 215 to calculate the similarity.

When the color difference signals required for allowing the surrounding similarity calculation processing of color differences to be executed are stored in the memories 209, 210 and 211, the color difference signals X–G$_v$, X–G$_h$ and X–G$_a$ are outputted from the memories 209, 210 and 211 to the surrounding similarity calculating units 213, 214 and 215, respectively.

The surrounding similarity calculating unit 213 serves as selecting means and calculates a color difference surrounding similarity Sv(k, l) at a missing G pixel position (k, l) as follows.

As shown in FIG. 11, the surrounding similarity calculating unit 213 first uses a central color difference signal (X–G$_v$)$_{k,l}$ ("(X–G$_v$)$_{k,l}$" is shortened form of "X(k,l)–G$_v$(k,l)", the same applies hereinafter) and eight color difference signals (X–G$_v$)$_{k-2,l-2}$, (X–G$_v$)$_{k,l-2}$, (X–G$_v$)$_{k+2,l-2}$, (X–G$_v$)$_{k-2,l}$, (X–G$_v$)$_{k-2,l}$, (X–G$_v$)$_{k-2,l+2}$, (X–G$_v$)$_{k,l+2}$, and (X–G$_v$)$_{k+2,l+2}$ at surrounding positions of the central color difference signal, to calculate a first color difference surrounding similarity candidate Sv$_1$(k, l) as follows. FIG. 11 is a diagram illustrating positions on the Bayer array of color difference signals used for calculating a surrounding similarity among color difference signals at the missing G signal positions calculated based on the vertical direction interpolation.

$$Sv_1(k, 1) = |(X-G_v)_{k-2,l-2} - (X-G_v)_{k,l}| + |(X-G_v)_{k,l-2} - (X-G_v)_{k,l}| +$$
$$|(X-G_v)_{k+2,l-2} - (X-G_v)_{k,l}| + |(X-G_v)_{k-2,l} - (X-G_v)_{k,l}| +$$
$$|(X-G_v)_{k+2,l} - (X-G_v)_{k,l}| + |(X-G_v)_{k-2,l+2} - (X-G_v)_{k,l}| +$$
$$|(X-G_v)_{k,l+2} - (X-G_v)_{k,l}| + |(X-G_v)_{k+2,l+2} - (X-G_v)_{k,l}|$$

Furthermore, the surrounding similarity calculating unit 213 uses the central color difference signal (X–G$_v$)$_{k,l}$ and the two color difference signals (X–G$_v$)$_{k,l-2}$ and (X–G$_v$)$_{k,l+2}$ at the surrounding positions in the part enclosed by the thick lines in FIG. 11 to calculate a difference absolute value sum, and further weights the difference absolute value sum to achieve a balance with the first color difference surrounding similarity candidate Sv$_1$(k, l) and calculates a second color difference surrounding similarity candidate Sv$_2$(k, l).

$$Sv_2(k,l) = \{|(X-G_v)_{k,l-2} - (X-G_v)_{k,l}| + |(X-G_v)_{k,l+2} - (X-G)_{k,l}|\} \times 4$$

The surrounding similarity calculating unit 213 compares the first color difference surrounding similarity candidate Sv$_1$(k, l) and the second color difference surrounding similarity candidate Sv$_2$(k, l) which are calculated as described above, and adopts as the color difference surrounding similarity Sv(k, l) the candidate having a value not larger than that of the other candidate (the candidate having a smaller value, when the values are not the same), that is, the candidate having a similarity not lower than that of the other candidate (the candidate having a higher similarity, when the similarities are not the same).

By setting one of the two color difference surrounding similarity candidates Sv$_1$(k, l) and Sv$_2$(k, l) which has a value not larger than that of the other candidate as the color difference surrounding similarity Sv(k, l), it is possible to handle both of a steep vertical edge border part and a gradually changing vertical edge border part. As a result, determination errors can be reduced.

Similarly, the surrounding similarity calculating unit 214 serves as selecting means and calculates a color difference surrounding similarity Sh(k, l) at the missing G pixel position (k, l) as follows.

As shown in FIG. 12, the surrounding similarity calculating unit 214 first uses a central color difference signal (X–G$_h$)$_{k,l}$ and eight color difference signals (X–G$_h$)$_{k-2,l-2}$, (X–G$_h$)$_{k,l-2}$, (X–G$_h$)$_{k+2,l-2}$, (X–G$_h$)$_{k-2,l}$, (X–G$_h$)$_{k-2,l+2}$, (X–G$_h$)$_{k,l+2}$, and (X–G$_h$)$_{k+2,l+2}$ at surrounding positions of the central color difference signal, to calculate a first color difference surrounding similarity candidate Sh$_1$(k, l) as follows. FIG. 12 is a diagram illustrating positions on the Bayer array of the color difference signals used for calculating a surrounding similarity among color difference signals at the missing G signal positions calculated based on the horizontal direction interpolation.

$$Sh_1(k, 1) = |(X - G_h)_{k-2,1-2} - (X - G_h)_{k,1}| + |(X - G_h)_{k,1-2} - (X - G_h)_{k,1}| +$$
$$|(X - G_h)_{k+2,1-2} - (X - G_h)_{k,1}| + |(X - G_h)_{k-2,1} - (X - G_h)_{k,1}| +$$
$$|(X - G_h)_{k+2,1} - (X - G_h)_{k,1}| + |(X - G_h)_{k-2,1+2} - (X - G_h)_{k,1}| +$$
$$|(X - G_h)_{k,1+2} - (X - G_h)_{k,1}| + |(X - G_h)_{k+2,1+2} - (X - G_h)_{k,1}|$$

Furthermore, the surrounding similarity calculating unit 214 uses the central color difference signal (X–G$_h$)$_{k,l}$ and the two color difference signals (X–G$_h$)$_{k-2,l}$ and (X–G$_h$)$_{k+2,l}$ at the surrounding positions in the part enclosed by the thick lines in FIG. 12 to calculate a difference absolute value sum, and further weights the difference absolute value sum to achieve a balance with the first color difference surrounding similarity candidate Sh$_1$(k, l) and calculates a second color difference surrounding similarity candidate Sh$_2$(k, l).

$$Sh_2(k,l) = \{|X-G_h)_{k-2,l} - (X-G_h)_{k,l}| + |(X-G_h)_{k+2,l} - (X-G_h)_{k,l}|\} \times 4$$

The surrounding similarity calculating unit 214 compares the first color difference surrounding similarity candidate Sh$_1$(k,l) and the second color difference surrounding similarity candidate Sh$_2$(k,l) which are calculated as described above, and adopts as the color difference similarity Sh(k,l) the candidate having a value not larger than that of the other candidate (the candidate having a smaller value, when the values are not the same), that is, the candidate having a similarity not lower than that of the other candidate (the candidate having a higher similarity, when the similarities are not the same).

By setting one of the two color difference surrounding similarity candidates $Sh_1(k, l)$ and $Sh_2(k, l)$ which has a value not larger than that of the other candidate as the color difference surrounding similarity $Sh(k, l)$, it is possible to handle both of a steep horizontal edge border part and a gradually changing horizontal edge border part. As a result, determination errors can be reduced.

The surrounding similarity calculating unit 215 calculates a color difference surrounding similarity $Sa(k, l)$ at the missing G pixel position $(k, l)$ as follows.

As shown in FIG. 13, the surrounding similarity calculating unit 215 uses a central color difference signal $(X-G_a)_{k,l}$ and eight color difference signals $(X-G_a)_{k-2,l-2}$, $(X-G_a)_{k,l-2}$, $(X-G_a)_{k+2,l-2}$, $(X-G_a)_{k-2,l}$, $(X-G_a)_{k+2,l}$, $(X-G_a)_{k-2,l+2}$, $(X-G_a)_{k,l+2}$, and $(X-G_a)_{k+2,l+2}$ at surrounding positions of the central color difference signal to calculate a difference absolute value sum, thereby calculating the color difference surrounding similarity $Sa(k, l)$ as follows. FIG. 13 is a diagram illustrating positions on the Bayer array of color difference signals used for calculating a surrounding similarity among color difference signals at the missing G signal positions calculated based on the adjacent four-pixel interpolation.

$$Sa(k, 1) = |(X - G_a)_{k-2,1-2} - (X - G_a)_{k,1}| + |(X - G_a)_{k,1-2} - (X - G_a)_{k,1}| +$$
$$|(X - G_a)_{k+2,1-2} - (X - G_a)_{k,1}| + |(X - G_a)_{k-2,1} - (X - G_a)_{k,1}| +$$
$$|(X - G_a)_{k+2,1} - (X - G_a)_{k,1}| + |(X - G_a)_{k-2,1+2} - (X - G_a)_{k,1}| +$$
$$|(X - G_a)_{k,1+2} - (X - G_a)_{k,1}| + |(X - G_a)_{k+2,1+2} - (X - G_a)_{k,1}|$$

The color difference surrounding similarities $Sv(k,l)$, $Sh(k,l)$ and $Sa(k,l)$ thus calculated by the surrounding similarity calculating units 213, 214 and 215 are inputted to the selection determining unit 216.

The selection determining unit 216 is selecting means that compares the values of these three color difference surrounding similarities $Sv(k,l)$, $Sh(k,l)$ and $Sa(k,l)$ to select one G interpolation method that provides the smallest color difference surrounding similarity value, and outputs the color difference candidate corresponding to the selected interpolation method as a color difference signal to the band-limited interpolation unit 103.

In addition, the G signals are buffered in the memory 212 and outputted from the memory 212 to the band-limited interpolation unit 103 in accordance with the color difference signal outputted from the selection determining unit 216.

Figure 3:
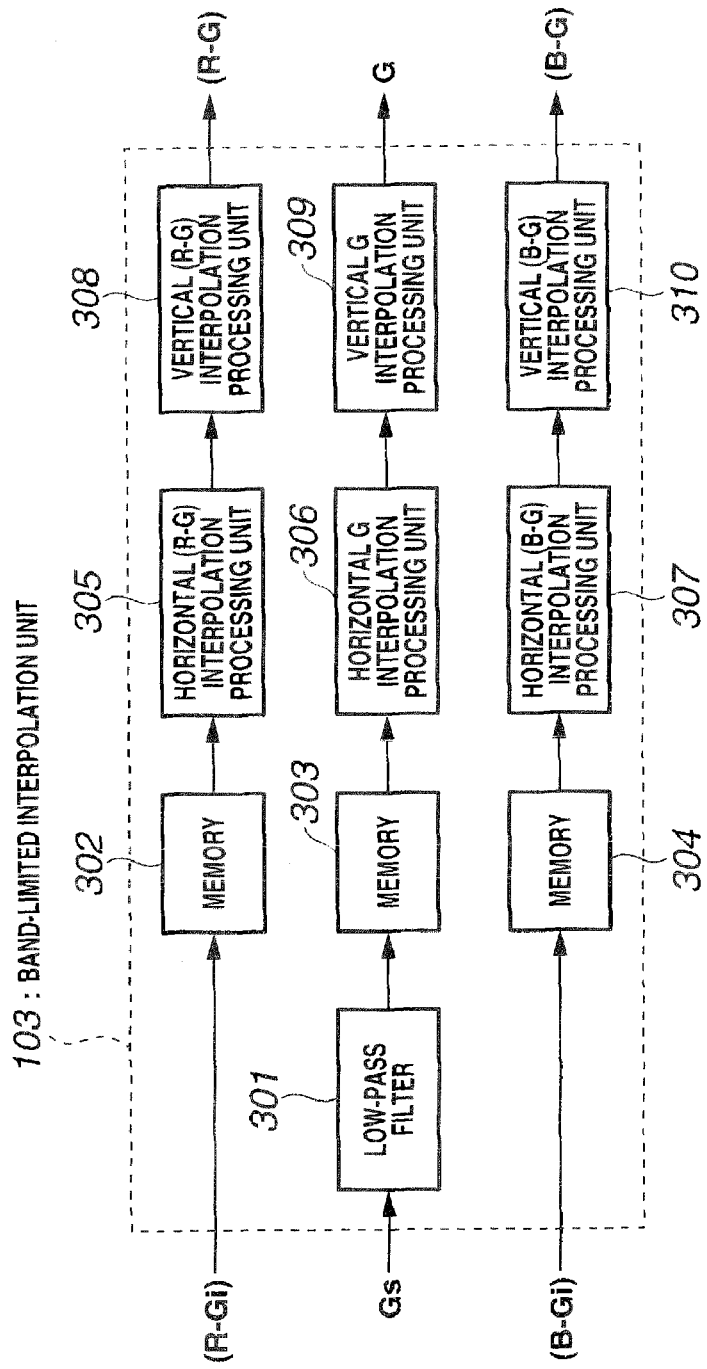
FIG. 3 is a block diagram showing a configuration of a hand-limited interpolation unit according to the first embodiment.

Next, FIG. 3 is a block diagram showing a configuration of the band-limited interpolation unit 103.

The band-limited interpolation unit 103 includes: a low-pass filter 301; a memory 302; a memory 303: a memory 304; a horizontal (R–G) interpolation processing unit 305; a horizontal G interpolation processing unit 306; a horizontal (B–G) interpolation processing unit 307; a vertical (R–G) interpolation processing unit 308; a vertical G interpolation processing unit 309; and a vertical (B–G) interpolation processing unit 310.

The signals inputted from the color difference calculating unit 102 to the band-limited interpolation unit 103 are color difference signals $X-G_i$ and the $G_s$ signals. More specifically, the color difference signals $X-G_i$ include the color difference signals $R-G_i$ and $B-G_i$.

The color difference signals $R-G_i$ and the color difference signals $B-G_i$ are inputted to the memory 302 and the memory 304, respectively, and stored therein.

In addition, the $G_s$ signals are first inputted to the low-pass filter 301 where the high frequency components are cut off and the band of the $G_s$ signals is limited to the bands same as those of the color difference signals $R-G_i$, $B-G_i$, and thereafter inputted to the memory 303 and stored therein.

Figure 14:
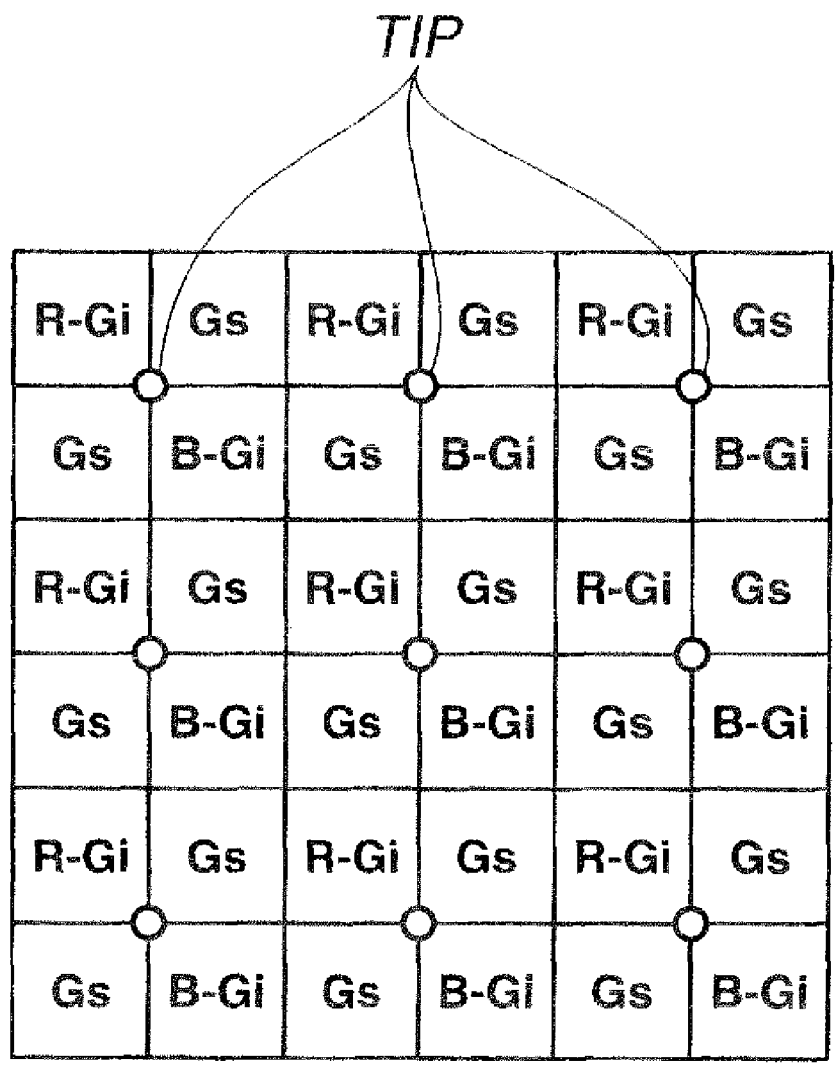
FIG. 14 is a diagram showing an example in which an image size is reduced to half both in the horizontal direction and in the vertical direction with a target interpolation position set at the center of 2×2 pixels according to the first embodiment.

The color difference signals R–G, are stored in the memory 302 by the number of lines required for the interpolation processing to target interpolation positions (for example, the positions TIP shown by white circles in FIG. 14. FIG. 14 is a diagram showing an example in which an image size is reduced to half both in the horizontal direction and in the vertical direction with the target interpolation positions set at the center of 2×2 pixels (that is, one example of obtaining smaller number of interpolation pixels than the number of the G pixels in the RGB Bayer array image)). The color difference signals $R-G_i$ read out from the memory 302 are subjected to an interpolation filter processing in the horizontal direction in the horizontal (R–G) interpolation processing unit 305, and thereafter subjected to an interpolation filter processing in the vertical direction in the vertical (R–G) interpolation processing unit 308.

Similarly, the $G_s$ signals are stored in the memory 303 by the number of lines required for the interpolation processing to the target interpolation positions (that is, the same sampling positions as the sampling positions for (R–G) interpolation). The $G_s$ signals read out from the memory 303 are subjected to the interpolation filter processing in the horizontal direction in the horizontal G interpolation processing unit 306, and thereafter subjected to the interpolation filter processing in the vertical direction in the vertical G interpolation processing unit 309.

Furthermore, the color difference signals $B-G_i$ are stored in the memory 304 by the number of lines required for the interpolation processing to the target interpolation positions (that is, the same sampling positions as the sampling positions for (R–G) and G interpolation). The color difference signals B–G, read out from the memory 304 are subjected to the interpolation filter processing in the horizontal direction in the horizontal (B–G) interpolation processing unit 307, and thereafter subjected to the interpolation filter processing in the vertical direction in the vertical (B–G) interpolation processing unit 310.

Such a processing performed by the hand-limited interpolation unit 103 makes it possible to obtain the color difference signals R–G and B–G, and the G signal at each of the same target interpolation position based on the color difference signals $R-G_i$ and $B-G_i$, and the $G_s$ signals which do not exist at the same position. The color difference signals R–G and B–G, and the G signal thus obtained are outputted to the RGB calculating unit 104. Such a configuration allows the circuit scale to be reduced, compared with the case where a full-sized image is once created, and thereafter a size reduction processing is performed.

Figure 4:
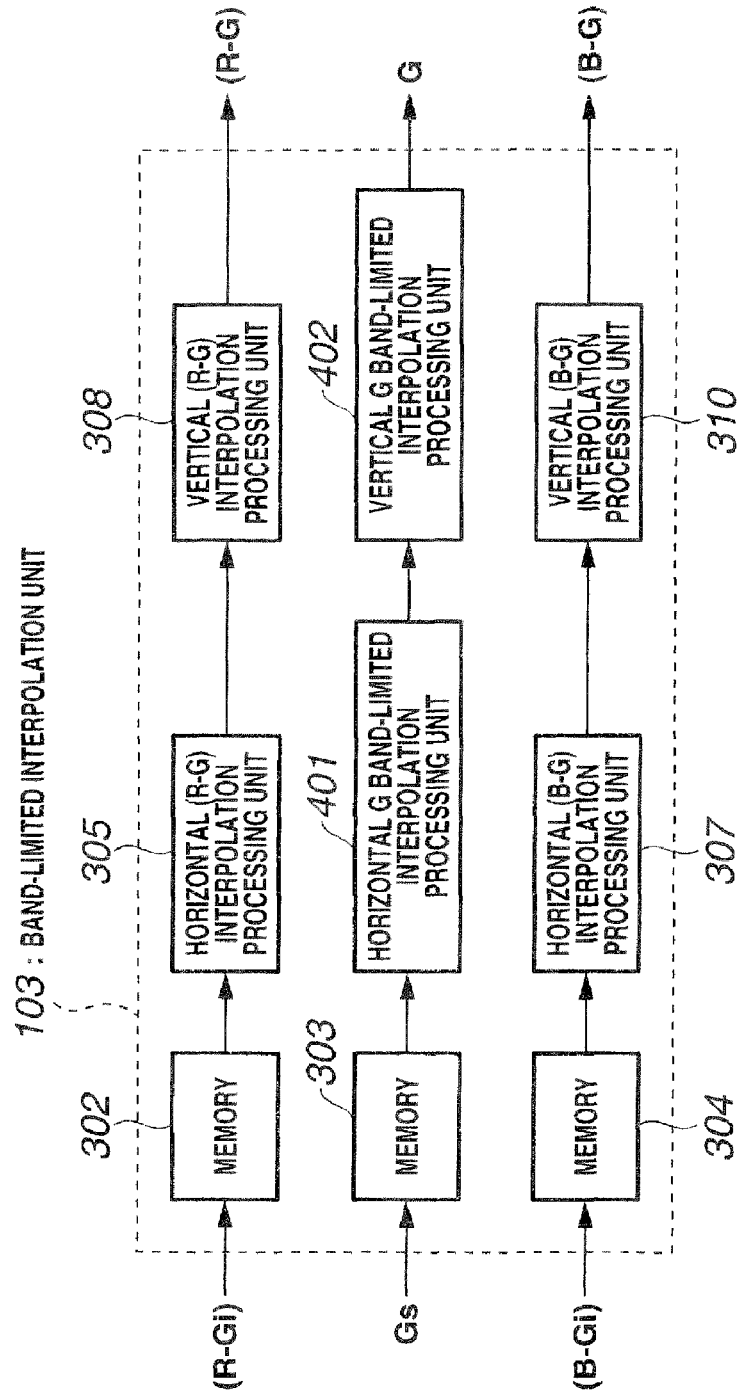
FIG. 4 is a block diagram showing a configuration of a modified example of the band-limited interpolation unit according to the first embodiment.

Note that, in the configuration of the hand-limited interpolation unit 103 shown in the above-described FIG. 3, the $G_s$ signals are passed through the low-pass filter and the frequency components thereof are cut off, and thereafter the interpolation is performed. However, in such a configuration, the circuit scale when implemented as hardware is not sufficiently reduced. With reference to FIG. 4, description will be made on a configuration in which the band-limited processing and the interpolation processing are performed at the same time in order to reduce the circuit scale. FIG. 4 is a block diagram showing a configuration of a modified example of the band-limited interpolation unit 103.

In the band-limited interpolation unit 103, the low-pass filter 301 is omitted from the configuration shown in FIG. 3, and a horizontal G band-limited interpolation processing unit 401 and a vertical G band-limited interpolation processing unit 402 are provided instead of the horizontal G interpolation processing unit 306 and the vertical G interpolation processing unit 309, respectively.

The color difference signals R–$G_i$, the color difference signals B–$G_i$, and the $G_s$ signals are inputted to the memory 302, the memory 304, and the memory 303 and stored therein, respectively. In the configuration shown in FIG. 4, the same effects as those of the low-pass filter 301 in FIG. 3 are achieved in the post-stage interpolation processing.

The interpolation filter processing of the color difference signals R–$G_i$ stored in the memory 302 and the interpolation filter processing of the color difference signals B–$G_i$ stored in the memory 304 are performed in the similar way as in the configuration shown in FIG. 3.

In addition, it is the same as described above that the $G_s$ signals are stored in the memory 303 by the number of lines required for the interpolation processing to the target interpolation positions, The $G_s$ signals read out from the memory 303 are subjected to the interpolation processing in the horizontal direction with the band in the horizontal direction limited by the horizontal G band-limited interpolation processing unit 401, and then subjected to the interpolation processing in the vertical direction with the band in the vertical direction limited by the vertical G band-limited interpolation processing unit 402. The horizontal G band-limited interpolation processing unit 401 and the vertical G band-limited interpolation processing unit 402 are specifically configured of Lanczos filters. In this embodiment, the Lanczos filters have characteristics as low-pass filters which cut off the signals in the band with the frequency equal to or higher than half of the Nyquist frequency from the $G_s$ signals both in the horizontal direction and the vertical direction (for example, the signals in the band are decreased by 6 dB) at the interpolation positions as shown in FIG. 14.

Such a processing performed by the band-limited interpolation unit 103 makes it possible to obtain the color difference signals R–G and B–G, and the G signal (interpolation (R–G) pixel, interpolation (B–G) pixel, and interpolation G pixel) at each of the same target interpolation positions based on the color difference signals R–$G_i$ and B–$G_i$, and the $G_s$ signals which do not exist at the same position. The color difference signals R–G and B–G, and the G signal thus obtained are outputted to the RGB calculating unit 104.

Note that the target interpolation positions are not limited to the positions TIP shown in FIG. 14. When the image size is reduced to one-quarter both in the horizontal direction and the vertical direction, for example, the target interpolation positions are located at the positions obtained by further thinning the interpolation positions TIP shown in FIG. 14 to half both in the horizontal direction and the vertical direction (this example is also one of the examples for obtaining interpolation pixels whose number is smaller than the number of G pixels in the RGB Bayer array image). Furthermore, in this case, the $G_s$ signals are passed through the Lanczos filter having the characteristic of low-pass filter which cuts off the signals in the band with the frequency equal to or higher than one-quarter of the Nyquist frequency in the horizontal direction and the vertical direction (similarly as described above, the signals in the band are decreased by 6 dB, for example). Also the color difference signals R–$G_i$, B–$G_i$ are passed through the Lanczos filter having the characteristic of low-pass filter which cuts off the signals in the band with the frequency equal to or higher than half of the Nyquist frequency from the color difference signals R–$G_i$, B–$G_i$ in the horizontal direction and the vertical direction (similarly, the signals in the band are decreased by 6 dB, for example, for example). Accordingly, in this case, the interpolation processing units 305, 308, 307 and 310 shown in FIG. 4 are respectively replaced with hand-limited interpolation processing units.

According to this configuration, it is possible to generate a reduced image without aliasing distortion.

Such a configuration shown in FIG. 4 makes it possible to further prevent the increase in the circuit scale when implemented as hardware, while preventing the degradation in image quality, compared with the configuration shown in FIG. 3.

Next, FIG. 5 is a block diagram showing a configuration of the RGB calculating unit 104.

The RGB calculating unit 104 includes an adder 501, an adder 502, a color matrix processing unit 503, a γ-correction unit 504, a γ-correction unit 505, and a γ-correction unit 506.

The RGB calculating unit 104 receives the color difference signals R–G, B–G, and the U signal at each pixel position which are outputted from the band-limited interpolation unit 103.

The adder 501 adds the inputted color difference signal R–G and the U signal at the same position as that of the inputted color difference signal R–G to generate an R signal and outputs the generated R signal to the color matrix processing unit 503.

The adder 502 adds the inputted color difference signal B–G and the G signal at the same position as that of the inputted color difference signal B–G to generate a B signal and outputs the generated B signal to the color matrix processing unit 503.

Furthermore, the U signal from the band-limited interpolation unit 103 is outputted as-is to the color matrix processing unit 503.

As a result of the processing, the R signal, the G signal, and the B signal at each pixel position are restored.

Upon receiving the restored R signal, G signal, and B signal, the color matrix processing unit 503 converts the restored signals to the signals in an sRGB space, for example. The color matrix processing unit 503 then outputs the converted R signal, the converted B signal, and the converted G signal to the γ-correction unit 504, the γ-correction unit 505, and the γ-correction unit 506, respectively.

If the converted R, G, and B signals inputted from the color matrix processing unit 503 are 12-bit signals, for example, the γ-correction units 504, 505, and 506 perform γ-correction on these signals to generate an Rγ signal, a Gγ signal, and a Bγ signal which are converted into 8-bit signals and output the generated Rγ signal, Gγ signal, and Bγ signal to the compressing/recording unit 105.

The subsequent processings performed by the compressing/recording unit 105 are as described above.

Although description has been made on the image processing apparatus above, the present invention may be a computer-readable recording medium for recording an image processing program for performing a similar processing as described above, or may be an image processing method for performing the similar processing as described above.

According to the first embodiment configured as such, when single-plate image data obtained by the primary color Bayer pattern image pickup device is changed to color (three-plate) image data, color difference signals are calculated first, and then the interpolation processing is performed while changing the size of the Bayer array image composed of color difference signals and G signals to a size in which the number of pixels is smaller than the number of G signals to obtain interpolation pixels. As a result, increase in the circuit scale when implemented as hardware can be prevented, while suppressing the generation of false color.

Furthermore, when the color difference signals are calculated, the optimal color difference candidate corresponding to the surrounding similarity is selected from a plurality of color difference candidates, and each of the color signals is restored based on the color difference candidate. Accordingly, it is possible to reproduce a high-definition color image while further suppressing the generation of false color and preventing resolution reduction and chroma reduction caused by the interpolation.

In addition, when an interpolated image composed of the interpolation pixels at the same sampling positions is obtained from a Bayer array image composed of color difference signals and G signals, the band of the G signals is limited, thereby effectively suppressing the generation of false color and luminance moiré.

Furthermore, in the case where the image processing apparatus is configured such that the interpolation processing and the band limiting of the G signals are performed at the same time, an increase in circuit scale when implemented as hardware can be further suppressed.

Note that a technology for suppressing an increase in circuit scale leads to a decrease in load of processing in an image processing program and an image processing method.

Second Embodiment

Figure 15:
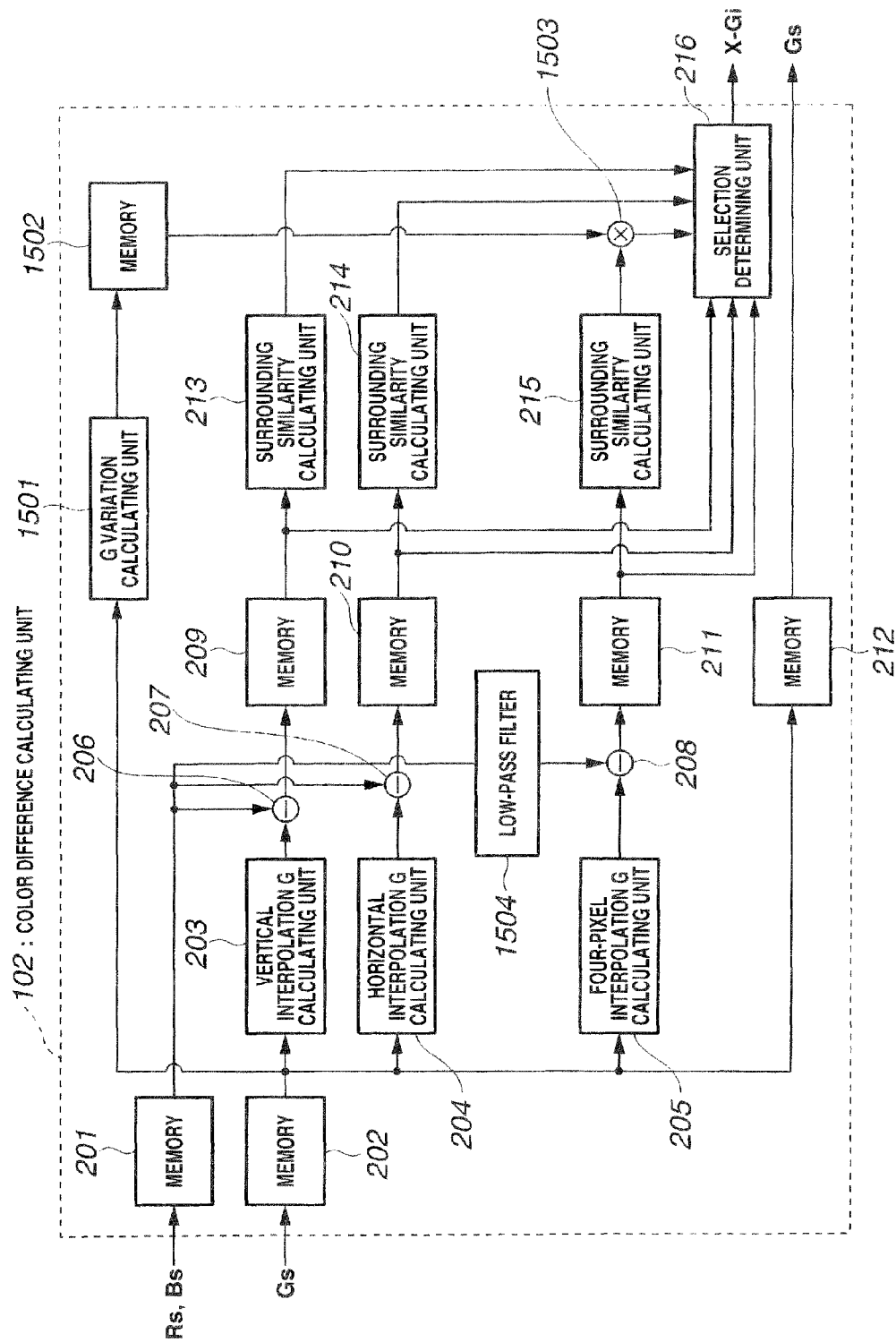
FIG. 15 is a block diagram showing a configuration of a color difference calculating unit according to a second embodiment of the present invention.
Figure 16:
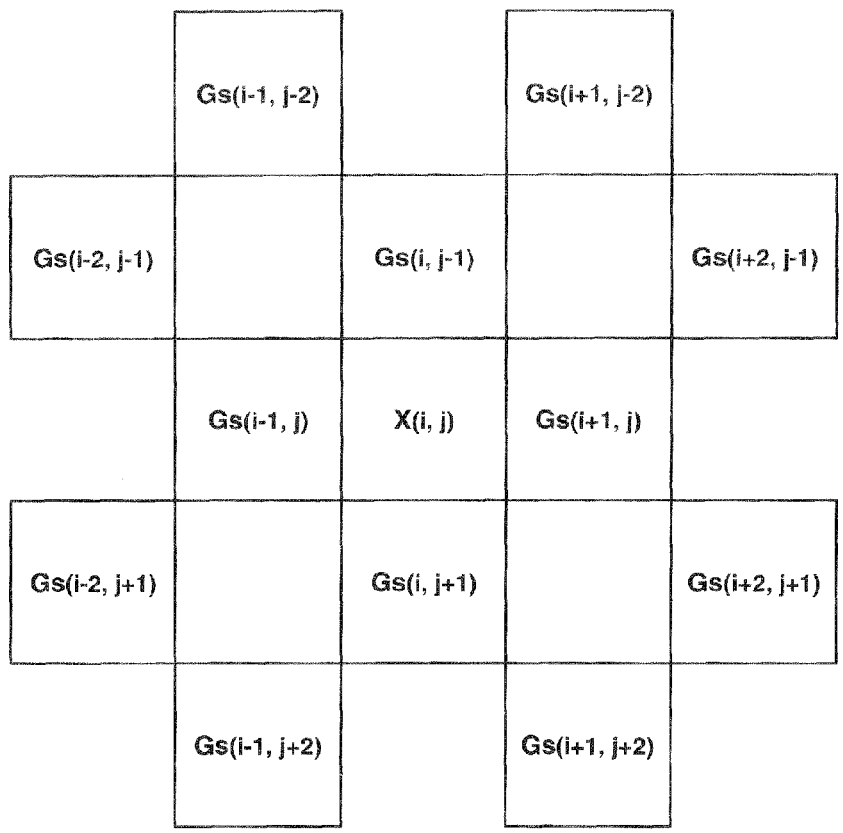
FIG. 16 is a diagram illustrating positions on the Bayer array of G signals used by a G variation calculating unit in the second embodiment.
Figure 17:
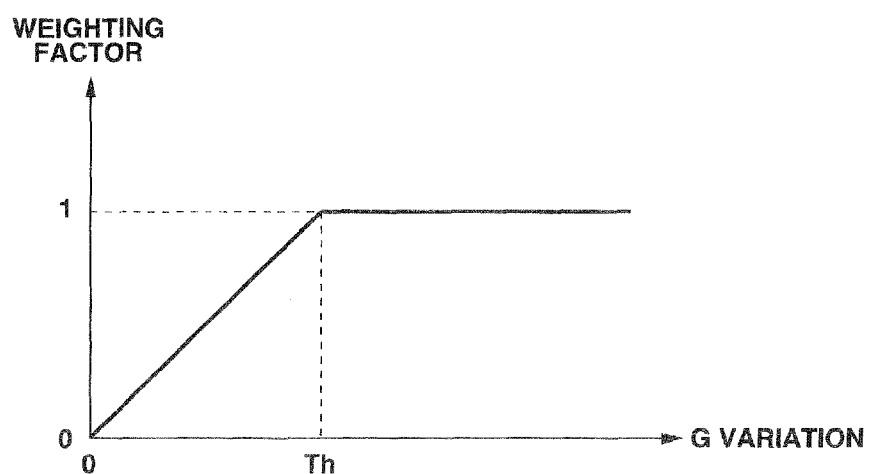
FIG. 17 is a diagram showing a relationship between a G variation calculated by the G variation calculating unit and a weighting factor for a surrounding similarity calculated using the adjacent four-pixel interpolation in the second embodiment.

FIGS. 15 to 17 show the second embodiment of the present invention. FIG. 15 is a block diagram showing the configuration of the color difference calculating unit, FIG. 16 is a diagram illustrating the positions on the Bayer array of G signals used by a G variation calculating unit, and FIG. 17 is a diagram showing a relationship between a G variation calculated by the G variation calculating unit and a weighting factor for the surrounding similarity calculated by using adjacent four-pixel interpolation.

In the second embodiment, the same components as those in the above-described first embodiment are designated with the same reference numerals, and the description thereof will be omitted. Only the different points will be mainly described.

The second embodiment is designed to further improve the image quality of a flat part of an image, compared with the first embodiment.

Specifically, in the switching determination of the three interpolation methods for the missing G pixels as described in the first embodiment, if a variation amount associated with an amount of noise specific to the image pickup device becomes more predominant in the flat part of the image than the difference among three color difference surrounding similarities associated with a local correlation of the image (the difference is essentially small in the flat part of the image), there is a possibility that an erroneous determination may occur when the smallest value of the color difference similarities is determined and frequent switching among the vertical interpolation, the horizontal interpolation, and the four-pixel interpolation occur randomly or periodically depending on the spatial development pattern of noise. Consequently, an unnatural pattern may emerge, which degrades the image quality.

In order to prevent such degradation of the image quality, in the present embodiment, an image variation detecting processing by quantifying the image variation and a weighting processing for increasing the priority of the four-pixel interpolation in accordance with the detected image variation are further performed.

Specifically, the color difference calculating unit 102 of the present embodiment is configured by adding a G variation calculating unit 1501, a memory 1502, a multiplier 1503, and a low-pass filter 1504 to the color difference calculating unit 102 in the above-described first embodiment. The above-described memory 202 is connected to the G variation calculating unit 1501, the G variation calculating unit 1501 is connected to the memory 1502, the memory 1502 is connected to the multiplier 1503, and the multiplier 1503 is connected to the selection determining unit 216. Furthermore, the multiplier 1503 is also connected to the surrounding similarity calculating unit 215. In addition, the memory 201 is connected to the low-pass filter 1504, and the low-pass filter 1504 is connected to the subtracting unit 208.

Description will be mainly made on some operations of the color difference calculating unit 102 shown in FIG. 15 that are different from the operations of the color difference calculating unit 102 shown in FIG. 2. The different operations are mainly related to the G variation calculating unit 1501, the memory 1502, the multiplier 1503, and the low-pass filter 1504.

The G variation calculating unit 1501 reads the $G_s$ signals arranged around a missing G pixel position $(i, j)$ as shown in FIG. 16 among the $G_s$ signals stored in the memory 202 and calculates a G variation $(i, j)$ as follows.

$$G\ \text{variation}(i,j) = D_c(i,j)/P + \{D_{r1}(i,j) + D_{r2}(i,j) + D_{r3}(i,j) + D_{r4}(i,j)\}/Q$$

The P and Q are arbitrary constants satisfying $P>0$ and $Q>0$.

$$D_c(i, j) = \left| \begin{array}{c} G_s(i-1, j) - G_s(i, j-1) + \\ G_s(i+1, j) - G_s(i, j+1) \end{array} \right| +$$

$$\left| \begin{array}{c} G_s(i-1, j) + G_s(i, j-1) - \\ G_s(i+1, j) - G_s(i, j+1) \end{array} \right| + \left| \begin{array}{c} G_s(i-1, j) - G_s(i, j-1) - \\ G_s(i+1, j) + G_s(i, j+1) \end{array} \right|$$

$$D_{r1}(i, j) = \left| \begin{array}{c} G_s(i-2, j-1) - G_s(i-1, j-2) + \\ G_s(i, j-1) - G_s(i-1, j) \end{array} \right| +$$

$$\left| \begin{array}{c} G_s(i-2, j-1) + G_s(i-1, j-2) - \\ G_s(i, j-1) - G_s(i-1, j) \end{array} \right| +$$

$$\left| \begin{array}{c} G_s(i-2, j-1) - G_s(i-1, j-2) - \\ G_s(i, j-1) + G_s(i-1, j) \end{array} \right|$$

$$D_{r2}(i, j) = \left| \begin{array}{c} G_s(i, j-1) - G_s(i+1, j-2) + \\ G_s(i+2, j-1) - G_s(i+1, j) \end{array} \right| +$$

$$\left| \begin{array}{c} G_s(i, j-1) + G_s(i+1, j-2) - \\ G_s(i+2, j-1) - G_s(i+1, j) \end{array} \right| + \left| \begin{array}{c} G_s(i, j-1) - G_s(i+1, j-2) - \\ G_s(i+2, j-1) + G_s(i+1, j) \end{array} \right|$$

$$D_{r3}(i, j) = \left| \begin{array}{c} G_s(i, j+1) - G_s(i+1, j) + \\ G_s(i+2, j+1) - G_s(i+1, j+2) \end{array} \right| +$$

$$\left| \begin{array}{c} G_s(i, j+1) + G_s(i+1, j) - \\ G_s(i+2, j+1) - G_s(i+1, j+2) \end{array} \right| +$$

$$\left| \begin{array}{c} G_s(i, j+1) - G_s(i+1, j) - \\ G_s(i+2, j+1) + G_s(i+1, j+2) \end{array} \right|$$

$$D_{r4}(i, j) = \left| \begin{array}{c} G_s(i-2, j+1) - G_s(i-1, j) + \\ G_s(i, j+1) - G_s(i-1, j+2) \end{array} \right| +$$

$$\left| \begin{array}{c} G_s(i-2, j+1) + G_s(i-1, j) - \\ G_s(i, j+1) - G_s(i-1, j+2) \end{array} \right| + \left| \begin{array}{c} G_s(i-2, j+1) - G_s(i-1, j) - \\ G_s(i, j+1) + G_s(i-1, j+2) \end{array} \right|$$

Based on the G variation (i, j) thus calculated, the 0 variation calculating unit 1501 calculates a weighting factor w(i, j) by using a function of a shape shown in FIG. 17. In the function shown in FIG. 17, the weight is 1 if the G variation is equal to or larger than a predetermined threshold Th, and the weight is proportional to the G variation if the G variation is smaller than the threshold Th (that is, the smaller the G variation, the smaller the weight). The relationship of the weighting factor w(i,j) to the G variation is calculated based on a predetermined calculating formula, or is converted with reference to a prestored lookup table.

The weighting factor w(i, j) calculated by the G variation calculating unit 1501 is outputted to the memory 1502 and stored therein.

The G interpolation candidates $G_v$, $G_h$ and $G_a$, and the color difference signals $X-G_v$ and $X-G_h$ are calculated similarly as in the case shown in FIG. 2. However, in calculation of the color difference signals $X-G_a$, X pixels ($R_s$ pixels or $B_s$ pixels) from the memory 201, after the high frequency components of the pixels are cut off by the low-pass filter 1504 (after the X pixels have become modified pixels $X_L$), are inputted to the subtracting unit 208, and the color difference signals $X-G_a$ are calculated. Accordingly, the color difference signals transferred from the memory 211 to the surrounding similarity calculating unit 215 and the selection determining unit 216 are color difference signals $X-G_a$ based on the X pixels (modified pixels $X_L$) subjected to the processing by the low-pass filter.

Next, the multiplier 1503 calculates Sa×w by multiplying the surrounding similarity Sa of the color differences $X-G_a$ related to the G interpolation candidate $G_a$, which is outputted from the surrounding similarity calculating unit 215, and the weighting factor w corresponding to the same pixel position as the surrounding similarity Sa among the weighting factors w stored in the memory 1502, and outputs the calculated Sa×w to the selection determining unit 216, as a new surrounding similarity (new correlation related value).

The subsequent determining processing by the selection determining unit 216 or the processing subsequent thereto are the same as those in the above-described first embodiment.

If such processings are performed, when the G variation is smaller than the predetermined threshold Th (i.e. w<1), Sa×w is a value smaller than Sa alone. Accordingly, the possibility that Sa×w is determined to be the smallest value in the determination by the selection determining unit 216 is increased. That is, in a flat area where G variation is small, there is less possibility that the vertical interpolation G or the horizontal interpolation G is selected, and the four-pixel interpolation G is selected with higher probability, thereby canceling the influence of noise.

According to the second embodiment configured as such, the generation of false color in the edge part can be prevented in substantially the same way as in the first embodiment, and also the generation of unnaturally patterned noise in the flat area can be prevented.

Third Embodiment

Figure 18:
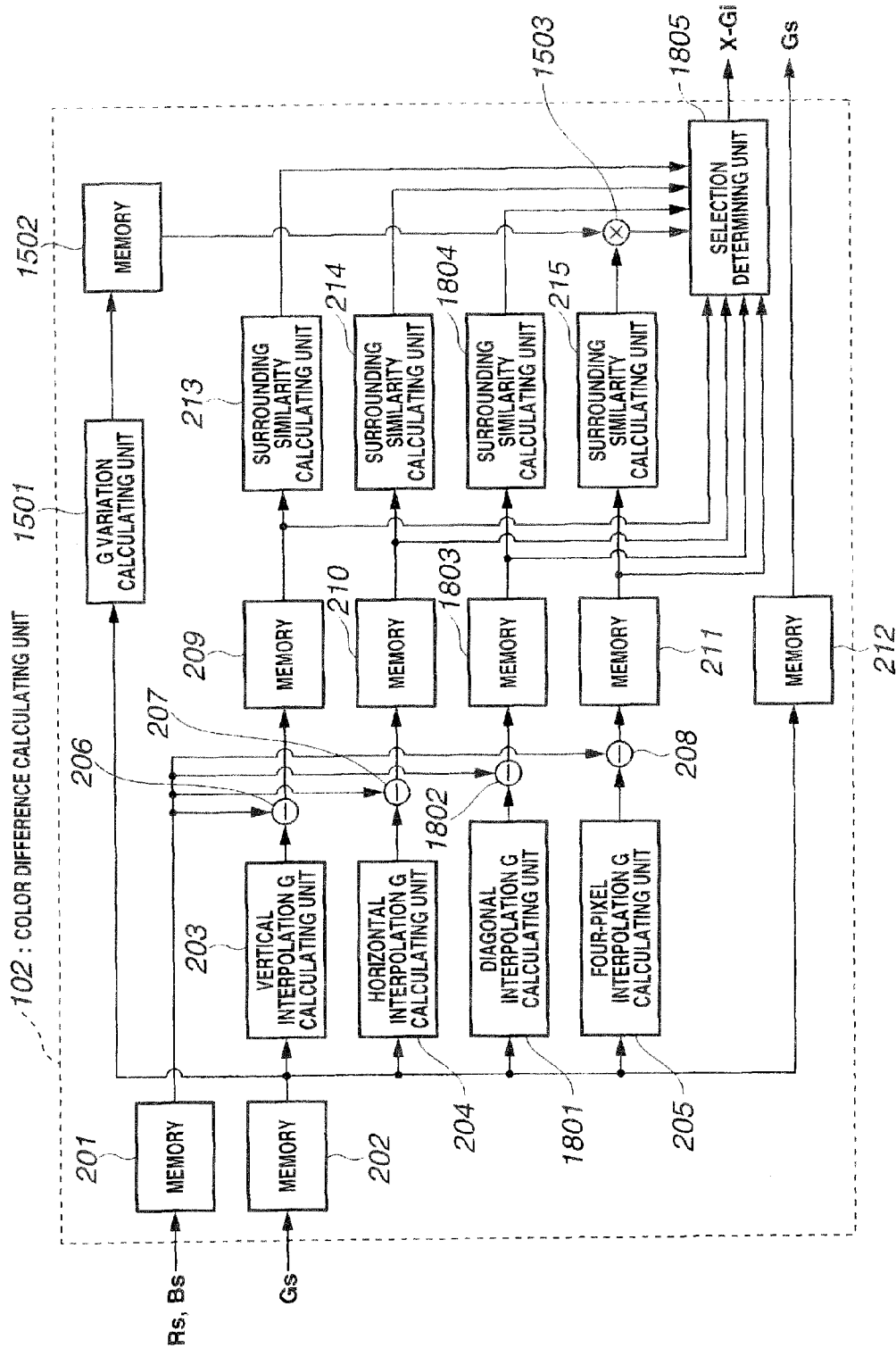
FIG. 18 is a block diagram showing a configuration of a color difference calculating unit according to a third embodiment of the present invention.
Figures 19, 20:
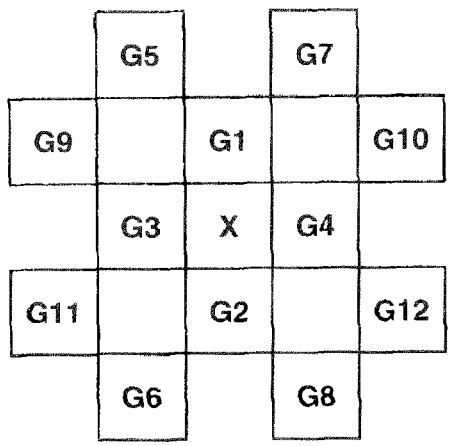
FIG. 19 is a diagram illustrating positions on the Bayer array of G signals of surrounding twelve pixels used in the diagonal direction interpolation of missing G signal positions in the third embodiment.
FIG. 20 is a diagram illustrating positions on the Bayer array of color difference signals used for calculating a surrounding similarity among the color difference signals at the missing G signal positions calculated based on surrounding twelve-pixel interpolation in the third embodiment.
Figure 21:
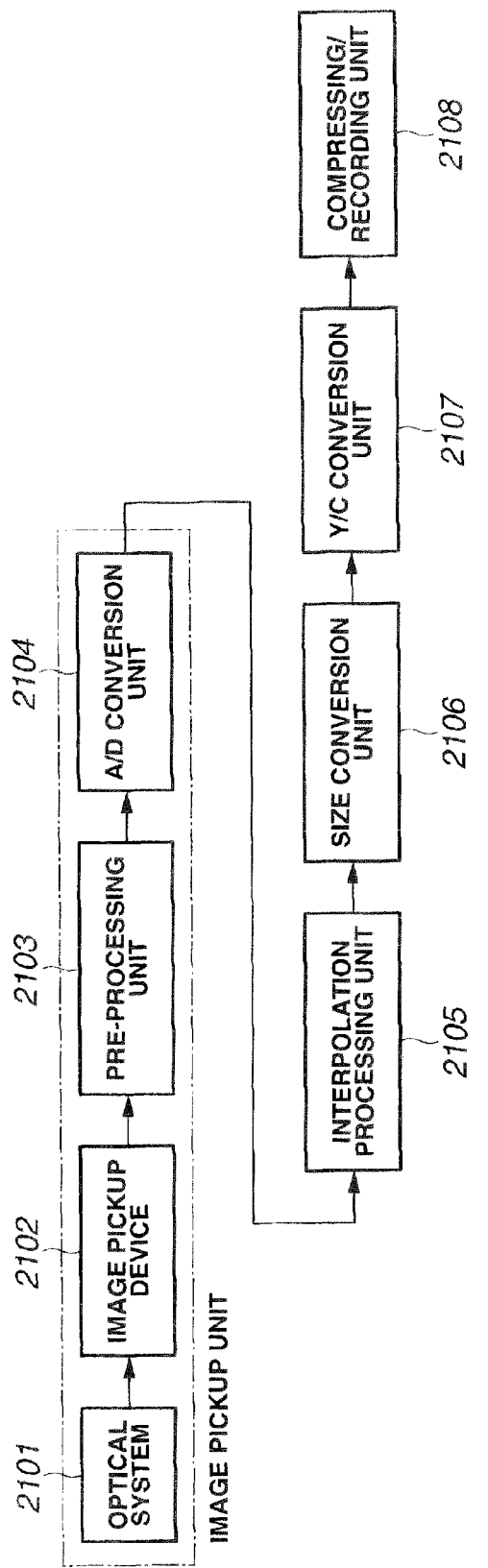
FIG. 21 is a block diagram showing an exemplary configuration of a conventional digital camera.
Figure 22:
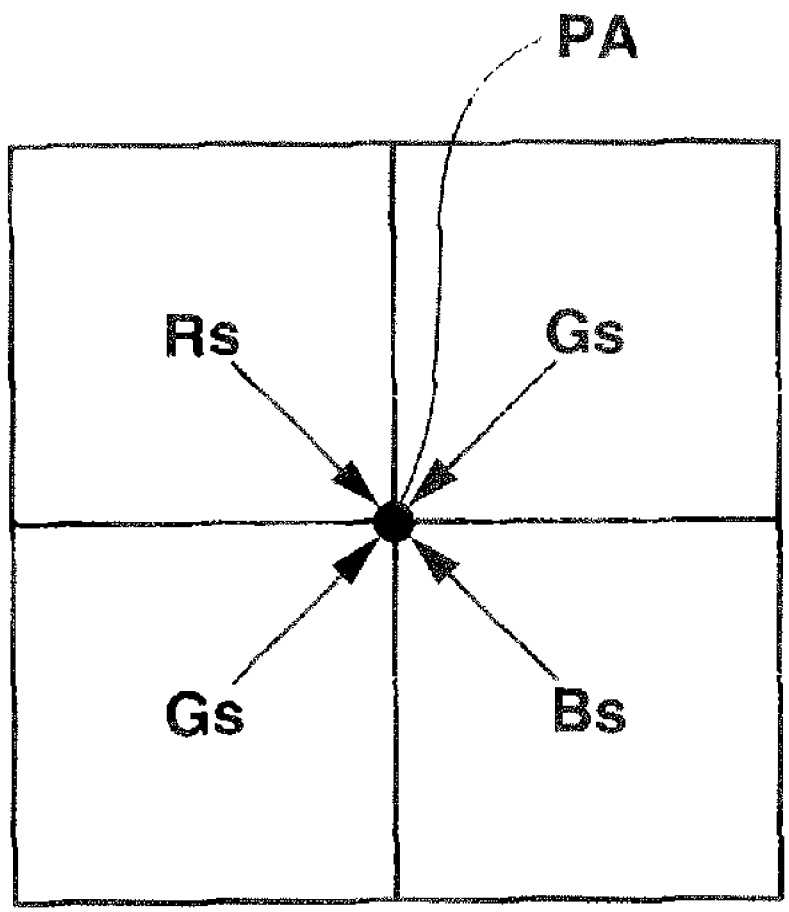
FIG. 22 is a diagram showing a part of an image photographed by a primary color Bayer pattern image pickup device.

FIGS. 18 to 20 show the third embodiment of the present invention. FIG. 18 is a block diagram showing the configuration of the color difference calculating unit, FIG. 19 is a diagram illustrating the positions on the Bayer array of G signals of surrounding twelve pixels used in the diagonal direction interpolation of the missing G signal positions, and FIG. 20 is a diagram illustrating positions on the Bayer array of the color difference signals used for calculating a surrounding similarity among the color difference signals at the missing G signal positions calculated based on the surrounding twelve-pixel interpolation.

In the third embodiment, the same components as those in the first and second embodiments are designated with the same reference numerals, and the description thereof will be omitted. Only the different points will be mainly described.

The third embodiment is configured to further improve the resolution in the diagonal direction compared to the second embodiment.

In the first and second embodiments, the missing G pixel is interpolated by the linear interpolation such as vertical direction interpolation, horizontal direction interpolation, and surrounding four-pixel interpolation. Among these interpolation methods, when the vertical direction interpolation is applied along the vertical direction edge and the horizontal direction interpolation is applied along the horizontal direction edge, the frequency characteristic in the direction perpendicular to the edge along which the interpolation is applied is not changed by the interpolation. That is, the edge is saved without becoming dull. On the other hand, there is no interpolation in a direction corresponding to an edge in the diagonal direction in the first and second embodiments. The surrounding four-pixel interpolation is primarily selected as an interpolation method in which the surrounding color difference similarity value is the smallest.

In order to improve the dullness of the edge in the diagonal direction which is likely to occur in such a case, the third embodiment further provides a diagonal interpolation processing including a characteristic with less reduction of high frequency components in the diagonal direction.

The configuration of the color difference calculating unit 102 including such a diagonal interpolation function will be described with reference to FIG. 18.

The color difference calculating unit 102 in the present embodiment is different from the color difference calculating unit 102 in the above-described second embodiment in that a diagonal interpolation G calculating unit 1801 as color difference candidate calculating means, a subtracting unit 1802 as color difference candidate calculating means, a memory 1803, and a surrounding similarity calculating unit 1804 are further added, a selection determining unit 1805 as selection means is provided instead of the selection determining unit 216, and the low-pass filter 1504 is omitted.

The above-described memory 202 is connected to the diagonal interpolation G calculating unit 1801, and the diagonal interpolation G calculating unit 1801 is connected to the subtracting unit 1802. In addition, the memory 201 is also connected to the subtracting unit 1802. The subtracting unit 1802 is connected to the memory 1803. The memory 1803 is connected to the surrounding similarity calculating unit 1804 and the selection determining unit 1805. In addition, the surrounding similarity calculating unit 1804 is also connected to the selection determining unit 1805. The selection determining unit 1805 is connected to the band-limited interpolation unit 103.

Description will be mainly made on some operations of the color difference calculating unit 102 shown in FIG. 18 that are different from the operations of the color difference calculating unit 102 in FIG. 15. The different operations are mainly related to the diagonal interpolation G calculating unit 1801, the subtracting unit 1802, the memory 1803, the surrounding similarity calculating unit 1804, and the selection determining unit 1805.

It is the same as described above that the color signals $R_s$, $B_s$ and the color signals $G_s$ which are outputted from the image pickup unit 101 are stored in the memory 201 and in the memory 202, respectively, by predetermined number of lines to obtain a delay until the pixels are collected enough to execute a two-dimensional interpolation processing of missing G pixel positions. However, the number of lines stored in the memories 201 and 202 is at least five in the example shown in FIG. 18.

As the interpolation method of missing G pixel, four kinds of arrangements of G pixels shown in FIGS. 8, 9, 10 and 19 are used.

It is the same as described above that the vertical interpolation G calculating unit 203 uses the G pixels arranged as shown in FIG. 8 to calculate an interpolation candidate of the missing G pixel based on the interpolation equation $G_v=(G_1+G_2)/2$.

Furthermore, it is also the same as described above that the horizontal interpolation G calculating unit 204 uses the G pixels arranged as shown in FIG. 9 to calculate an interpolation candidate of the missing G pixel based on the interpolation equation $G_h=(G_3+G_4)/2$.

Furthermore, it is also the same as described above that the four-pixel interpolation G calculating unit 205 uses the G pixels arranged as shown in FIG. 10 to calculate an interpolation candidate of the missing G pixel based on the interpolation equation $G_a=(G_1+G_2+G_3+G_4)/4$.

The diagonal interpolation G calculating unit 1801 of the present embodiment uses the G pixels arranged as shown in FIG. 19 to calculate an interpolation candidate of the missing G pixel based on the interpolation equation $G_d=(G_1+G_2+G_3+G_4)\times\alpha-(G_5+G_6+G_7+G_8+G_9+G_{10}+G_{11}+G_{12})\times\beta$. In this case, $\alpha$ and $\beta$ are arbitrary constants satisfying $\alpha\times 4 - \beta\times 8 = 1$, in which $\alpha > (1/4)$ and $\beta > 0$.

The interpolation candidates calculated by the vertical interpolation G calculating unit 203, the horizontal interpolation G calculating unit 204, the four-pixel interpolation G calculating unit 205, and the diagonal interpolation G calculating unit 1801 are outputted to the subtracting units 206, 207, 208, and 1802, respectively.

The subtracting units 206, 207, 208, and 1802 read the X pixels at the same positions as the missing G pixels from the memory 201 and subtract the above-described G interpolation candidates to calculate the color difference candidates $X-G_v$, $X-G_h$, $X-G_a$ and $X-G_d$, respectively.

The color difference candidates $X-G_v$, $X-G_h$, $X-G_a$, and $X-G_d$ thus calculated are stored in the memories 209, 210, 211 and 1803, respectively.

Note that the color difference signals stored in the memories 209, 210, 211, and 1803 will be used later by the surrounding similarity calculating units 213, 214, 215, and 1804 for calculating the surrounding similarity. The surrounding similarity calculating units 213, 214, 215, and 1804 calculate the similarity of color difference signals in a neighboring area including three rows and three columns of same-type color difference signals (i.e, color difference signals with the same type of G interpolation candidates $G_v$, $G_h$, $G_a$ and $G_d$ used for calculating the color difference candidates and with the same color X. Therefore, for example, $R-G_v$ and $B-G_v$ are not the same-type color difference signals, and also $R-G_v$ and $R-G_h$ are not the same-type color difference signals) as shown in FIG. 11, FIG. 12, FIG. 13 and FIG. 20. Accordingly, each of the memories 209, 210, 211 and 1803 can store at least five lines of data to obtain a delay that allows each of the surrounding similarity calculating units 213, 214, 215 and 1804 to calculate the similarity.

When the color difference signals enough to execute the surrounding similarity calculating processing of color difference are stored in the memories 209, 210, 211 and 1803, the color difference signals $X-G_v$, $X-G_h$, $X-G_a$ and $X-G_d$ are outputted to the surrounding similarity calculating units 213, 214, 215 and 1804, respectively.

Similarly as in the case of Sv(k, l), Sh(k, l) and Sa(k, l) described in the first and the second embodiments, the surrounding similarity calculating unit 1804 uses, as shown in FIG. 20, a central color difference signal $(X-G_d)_{k,l}$ and eight color difference signals $(X-G_d)_{k-2,l-2}$, $(X-G_d)_{k,l-2}$, $(X-G_d)_{k+2,l-2}$, $(X-G_d)_{k-2,l}$, $(X-G_d)_{k+2,l}$, $(X-G_d)_{k-2,l+2}$, $(X-G_d)_{k,l+2}$ and $(X-G_d)_{k+2,l+2}$ at surrounding positions of the central color difference signal to calculate a difference absolute value sum, thereby calculating the color difference surrounding similarity Sd(k, l) at the missing G pixel position (k, l) as follows.

$$Sd(k, l) = |(X-G_d)_{k-2,l-2} - (X-G_d)_{k,l}| + |(X-G_d)_{k,l-2} - (X-G_d)_{k,l}| +$$
$$|(X-G_d)_{k+2,l-2} - (X-G_d)_{k,l}| + |(X-G_d)_{k-2,l} - (X-G_d)_{k,l}| +$$
$$|(X-G_d)_{k+2,l} - (X-G_d)_{k,l}| + |(X-G_d)_{k-2,l+2} - (X-G_d)_{k,l}| +$$
$$|(X-G_d)_{k,l+2} - (X-G_d)_{k,l}| + |(X-G_d)_{k+2,l+2} - (X-G_d)_{k,l}|$$

Among the four color difference surrounding similarities Sv(k,l), Sh(k,l), and Sa(k, l) and Sd(k, l) thus calculated, the color difference surrounding similarity Sa(k,l) at the time of the four-pixel interpolation is multiplied in the multiplying unit 1503 by the weighting factor w(k, l) that is calculated by the G variation calculating unit 1501 and stored in the memory 1502, similarly as in the above-described second embodiment.

The four color difference surrounding similarities Sv(k, l), Sh(k, l), Sd(k, l), and Sa(k, l)×w(k, l) are inputted to the selection determining unit 1805.

The selection determining unit 1805 compares the values of the four color difference similarities Sv(k, l), Sh(k, l), Sd(k, l), and Sa(k, l)×w(k, l), selects a G interpolation method that provides the smallest color difference surrounding similarity value, and outputs a selection signal corresponding to the selected interpolation method to the band-limited interpolation unit 103. Note that if a plurality of smallest color difference surrounding similarity values exist, the selection determining unit 1805 sets the priorities in the order of Sa(k, l)×w(k, l), Sd(k, l), Sh(k, l), and Sv(k, l), and selects one G interpolation method according to the priorities.

Specifically, the selection determining unit 1805 outputs to the band-limited interpolation unit 103 the $(X-G_v)_{k,l}$ when the color difference surrounding similarity Sv(k,l) is the smallest, $(X-G_h)_{k,l}$ when Sh(k,l) is the smallest, $(X-G_d)_{k,l}$ when Sd(k,l) is the smallest, and $(X-G_a)_{k,l}$ when Sa(k,l)×w(k,l) is the smallest.

The third embodiment thus configured can provide substantially the same effects as those in the first and the second embodiments, and can select a missing G pixel as an unspecified parameter when calculating the color difference, as the most probable one based on the prerequisite in which the correlativity of the color difference signals is locally high, among the four types of G interpolation candidates. As a result, the missing G pixels optimal for the local edge of the image are interpolated, thereby capable of preventing the generation of false color and the resolution degradation of not only the edge parts in the horizontal and vertical directions but also the edge part in the diagonal direction.

Note that the present invention is not limited to the embodiments described above, but can be embodied by modifying constituent elements upon implementation without departing from the scope of the present invention. Appropriate combinations of a plurality of constituent elements disclosed in the above embodiments make it possible to form various inventions. For example, some of the constituent elements shown in the embodiments may be removed. Furthermore, constituent elements across different embodiments may be appropriately combined. Therefore, it is obvious that various changes and applications can be made without departing from the scope of the invention.

What is claimed is:

1. An image processing apparatus comprising:
   color difference calculating means for creating (R−G) pixels at R pixel positions and (B−G) pixels at B pixel positions and generating an (R−G)G(B−G) Bayer array image from an RGB Bayer array image;
   band-limited interpolation means for interpolating sampling positions of a number that is smaller than a number of G pixels in the RGB Bayer array image to obtain an equal number of interpolation (R−G), interpolation G, and interpolation (B−G) pixels at a same sampling position from the (R−G)G(B−G) Bayer array image; and
   RGB calculating means for calculating, for each of the sampling positions, an interpolation R pixel based on the interpolation (R−G) pixel and the interpolation G pixel obtained by the band-limited interpolation means, and an interpolation B pixel based on the interpolation (B−G) pixel and the interpolation G pixel obtained by the band-limited interpolation means, to obtain interpolation R pixels, interpolation G pixels, and interpolation B pixels constituting a color image in which R, G and B pixels coincide at each sampling position;
   wherein the color difference calculating means includes:
   color difference candidate calculating means for calculating, when a position on the RGB Bayer array image is expressed by (x, y) (x is an integer indicative of a pixel position in a horizontal direction, and y is an integer indicative of a pixel position in a vertical direction) and an R pixel or a B pixel at a G pixel missing position ($x_0$, $y_0$) is defined as X($x_0$, $y_0$), M types (M is an integer equal to or larger than 2) of G interpolation candidates $G_t(x_0, y_0)$ (t=1, . . . , M) for the X($x_0$, $y_0$) pixel, and calculating M types of color difference candidates X($x_0$, $y_0$)−$G_t$($x_0$, $y_0$) based on the calculated M types of G interpolation candidates $G_t(x_0, y_0)$; and
   selecting means for calculating M types of color difference correlation related values, based on a plurality of color difference candidates of X, X($x_0$+n $y_0$+m)−$G_t$($x_0$+n $y_0$+m) calculated for surrounding positions ($x_0$+n $y_0$+m) (n and m are arbitrary integers which are not 0 at the same time) based on G interpolation candidates $G_t$($x_0$+n $y_0$+m) which are the same type t as the G interpolation candidates $G_t$($x_0$, $y_0$) used when calculating the color difference candidates X($x_0$, $y_0$)−$G_t$($x_0$, $y_0$) and which are calculated at the surrounding positions ($x_0$+n $y_0$+m), and based on the color difference candidates X($x_0$, $y_0$)−$G_t$($x_0$, $y_0$), and for selecting, as a color difference, a color difference candidate X($x_0$, $y_0$)-G ($x_0$, $y_0$)(1≦p≦M) calculated based on a G interpolation candidate $G_p$($x_0$, $y_0$) among the M types of G interpolation candidates $G_t$($x_0$, $y_0$), based on the calculated M types of color differences correlation related values.

2. The image processing apparatus according to claim 1, wherein the color difference candidate calculating means (i) calculates an average of two G pixels adjacent above and below the X pixel as one type of G interpolation candidate among the M types of G interpolation candidates, (ii) calculates an average of two G pixels adjacent left and right of the X pixel as one type of G interpolation candidate among the M types of G interpolation candidates, and (iii) calculates an average of four G pixels adjacent above, below, left and right of the X pixel as one type of G interpolation candidate among the M types of G interpolation candidates.

3. The image processing apparatus according to claim 2, wherein the color difference candidate calculating means uses twelve G pixels, G($x_0$−1, $y_0$), G($x_0$+1, $y_0$), G($x_0$, $y_0$−1), G($x_0$, $y_0$+1), G($x_0$−2, $y_0$−1), G($x_0$−2, $y_0$+1), G($x_0$+2, $y_0$−1), G($x_0$+2, $y_0$+1), G($x_0$−1, $y_0$−2), G($x_0$−1, $y_0$+2), G($x_{0+}$1, $y_0$−2), and G($x_0$+1, $y_0$+2) which are located near the X($x_0$, $y_0$) pixel, to further calculate one type of G interpolation candidate $G_t(x_0, y_0)$ among the M types of G interpolation candidates, based on the following expression $$G_t(x_0, y_0) = \left\{ \begin{array}{l} G(x_0-1, y_0) + G(x_0+1, y_0) + \\ G(x_0, y_0-1) + G(x_0, y_0+1) \end{array} \right\} \times \alpha - \left\{ \begin{array}{l} G(x_0-2, y_0-1) + G(x_0-2, y_0+1) + \\ G(x_0+2, y_0-1) + G(x_0+2, y_0+1) + \\ G(x_0-1, y_0-2) + G(x_0-1, y_0+2) + \\ G(x_0+1, y_0-2) + G(x_0+1, y_0+2) \end{array} \right\} \times \beta$$

(where α and β are arbitrary constants satisfying α×4−β×8=1 in which α>(1/4), β>0).

4. The image processing apparatus according to claim 2, wherein the color difference candidate calculating means calculates a modified pixel $X_L$ obtained by limiting a band of the X pixel using a surrounding same color X, for the G interpolation candidate calculated as the average of the four G pixels adjacent above, below, left and right of the X pixel, and calculates a color difference candidate using the modified pixel $X_L$ and the G interpolation candidate.

5. The image processing apparatus according to claim 3, wherein the selecting means calculates variation of values of G pixels around the X pixel for a correlation related value between (i) the color difference candidate for the G pixel missing position which is calculated based on the G interpolation candidate calculated as an average of the four G pixels adjacent above, below, left and right of the X pixel and (ii) the surrounding color difference candidates, to calculate a weighting factor based on the variation, and sets a value obtained by multiplying the correlation related value by the weighting factor as a new correlation related value.

6. The image processing apparatus according to claim 4, wherein the selecting means calculates variation of values of G pixels around the X pixel for a correlation related value between (i) the color difference candidate for the G pixel missing position which is calculated based on the G interpolation candidate calculated as an average of the four G pixels adjacent above, below, left and right of the X pixel and (ii) the surrounding color difference candidates, to calculate a weighting factor based on the variation, and set sets a value obtained by multiplying the correlation related value by the weighting factor as a new correlation related value.

7. The image processing apparatus according to claim 2, wherein the selecting means selects, as a correlation related value between (i) the color difference candidate for the G pixel missing position calculated based on the G interpolation candidate calculated as the average of the two pixels adjacent above and below the X pixel and (ii) the surrounding color difference candidates, a correlation related value that indicates a correlativity that is not lower than a correlativity indicated by another correlation related value out of:

a correlation related value calculated between the color difference candidate for the G pixel missing position and the same color X and the same type t of eight color difference candidates positioned nearest around the G pixel missing position; and a correlation related value calculated between the color difference candidate for the G pixel missing position and two color difference candidates positioned above and below the X pixel among the same color X and the same type t of eight color difference candidates positioned nearest around the G pixel missing position.

8. The image processing apparatus according to claim 2, wherein the selecting means selects, as a correlation related value between (i) the color difference candidate for the G pixel missing position calculated based on the G interpolation candidate calculated as the average of the two G pixels adjacent left and right of the X pixel and (ii) the surrounding color difference candidates, a correlation related value that indicates a correlativity that is not lower than a correlativity indicated by another correlation related value out of:

a correlation related value calculated between the color difference candidate for the G pixel missing position and the same color X and the same type t of eight color difference candidates positioned nearest around the G pixel missing position; and a correlation related value calculated between the color difference candidate for the G pixel missing position and two color difference candidates positioned left and right of the X pixel among the same color X and the same type t of eight color difference candidates positioned nearest around the G pixel missing position.

9. The image processing apparatus according to claim 1, wherein the correlation related value is a difference absolute value sum of the color difference candidate for the G pixel missing position and the same color X and the same type t of one or more color difference candidates positioned around the G pixel missing position, and the selecting means selects one color difference candidate corresponding to one correlation related value indicating that correlativity is the highest among the M types of correlation related values to set the selected color difference candidate as the color difference.

10. The image processing apparatus according to claim 1, wherein the band-limited interpolation means uses an interpolation filter on the (R–G) pixels and the (B–G) pixels of the (R–G)G(B–G) Bayer array image and uses a low-pass filter and an interpolation filter on the G pixels of the (R–G)G(B–G) Bayer array image.

11. The image processing apparatus according to claim 1, wherein the band-limited interpolation means uses an interpolation filter on the (R–G) pixels and the (B–G) pixels of the (R–G)G(B–G) Bayer array image and uses a Lanczos filter on the G pixels of the (R–G)G(B–G) Bayer array image.

12. A non-transitory computer-readable recording medium which records an image processing program for executing:

a color difference calculating step for creating (R–G) pixels at R pixel positions and (B–G) pixels at B pixel positions and generating an (R–G)G(B–G) Bayer array image from an RGB Bayer array image;

a band-limited interpolation step for interpolating sampling positions of a number that is smaller than a number of G pixels in the RGB Bayer array image to obtain an equal number of interpolation (R–G), interpolation G and interpolation (B–G) pixels at a same sampling position from the (R–G)G(B–G) Bayer array image; and an RGB calculating step for calculating, for each of the sampling positions, an interpolation R pixel based on the interpolation (R–G) pixel and the interpolation G pixel obtained by the band-limited interpolation step, and an interpolation B pixel based on the interpolation (B–G) pixels and the interpolation G pixel obtained by the band-limited interpolation step, to obtain interpolation R pixels, interpolation G pixels, and interpolation B pixels constituting a color image in which R, G and B pixels coincide at each sampling position;

wherein the color difference calculating step includes:

a color difference candidate calculating step for calculating, when a position on the RGB Bayer array image is expressed by (x, v) (x is an integer indicative of a pixel position in a horizontal direction, and v is an integer indicative of a pixel position in a vertical direction) and an R pixel or a B pixel at a G pixel missing position $(x_0, y_0)$ is defined as $X(x_0, y_0)$, M types (M is an integer equal to or larger than 2) of G interpolation candidates $G_t(x_0, y_0)$ (t=1, ..., M) for the $X(x_0, y_0)$ pixel, and calculating M types of color difference candidates $X(x_0, y_0)-G_t(x_0, y_0)$ based on the calculated M types of G interpolation candidates $G_t(x_0, y_0)$; and a selecting step for calculating M types of color difference correlation related values, based on a plurality of color difference candidates of X, $X(x_0+n\ y_0+m)-G_t(x_0+n\ y_0+m)$ calculated for surrounding positions $(x_0+n\ y_0+m)$ (n and m are arbitrary integers which are not 0 at the same time) based on G interpolation candidates $G_t(x_0+n\ y_0+m)$ which are the same type t as the G interpolation candidates $G_t(x_0, y_0)$ used when calculating the color difference candidates $X(x_0, y_0)-G_t(x_0, y_0)$ and which are calculated at the surrounding positions $(x_0+n\ y_0+m)$, and based on the color difference candidates $X(x_0, y_0)-G_t(x_0, y_0)$, and for selecting, as a color difference, a color difference candidate $X(x_0, y_0)-G_p(x_0, y_0)(1 \leq p \leq M)$ calculated based on a G interpolation candidate $G_p(x_0, y_0)$ among the M types of G interpolation candidates $G_t(x_0, y_0)$, based on the calculated M types of color differences correlation related values.

13. An image processing method comprising:

a color difference calculating step for creating (R–G) pixels at R pixel positions and (B–G) pixels at B pixel positions and generating an (R–G)G(B–G) Bayer array image from an RGB Bayer array image;

a band-limited interpolation step for interpolating sampling positions of a number that is smaller than a number of G pixels in the RGB Bayer array image to obtain an equal number of interpolation (R–G), interpolation G, and interpolation (B–G) pixels at a same sampling position from the (R–G)G(B–G) Bayer array image; and an RGB calculating step for calculating, for each of the sampling positions, an interpolation R pixel based on the interpolation (R–G) pixel and the interpolation G pixel obtained by the hand-limited interpolation step, and an interpolation B pixel based on the interpolation (B–G) pixel and the interpolation G pixel obtained by the band-limited interpolation step, to obtain interpolation R pixels, interpolation G pixels, and interpolation B pixels constituting a color image in which R, G and B pixels coincide at each sampling position;

wherein the color difference calculating step includes:

a color difference candidate calculating step for calculating, when a position on the RGB Bayer array image is expressed by (x, y) (x is an integer indicative of a pixel position in a horizontal direction, and v is an integer indicative of a pixel position in a vertical direction) and an R pixel or a B pixel at a G pixel missing position $(x_0, y_0)$ is defined as $X(x_0, y_0)$, M types (M is an integer equal to or larger than 2) of G interpolation candidates $G_t(x_0, y_0)$ (t=1, ..., M) for the $X(x_0, y_0)$ pixel, and calculating M types of color difference candidates $X(x_0, y_0)-G_t(x_0, y_0)$ based on the calculated M types of G interpolation candidates $G_t(x_0, y_0)$; and a selecting step for calculating M types of color difference correlation related values, based on a plurality of color difference candidates of X, $X(x_0+n\ y_0+m)-G_t(x_0+n\ y_0+m)$ calculated for surrounding positions $(x_0+n\ y_0+m)$ (n and m are arbitrary integers which are not 0 at the same time) based on G interpolation candidates $G_t(x_0+n\ y_0+m)$ which are the same type t as the G interpolation candidates $G_t(x_0, y_0)$ used when calculating the color difference candidates $X(x_0, y_0)-G_t(x_0, y_0)$ and which are calculated at the surrounding positions $(x_0+n\ y_0+m)$, and based on the color difference candidates $X(x_0, y_0)-G_t(x_0, y_0)$, and for selecting, as a color difference, a color difference candidate $X(x_0, y_0)-G_p(x_0, y_0)(1 \leq p \leq M)$ calculated based on a G interpolation candidate $G_p(x_0, y_0)$ among the M types of G interpolation candidates $G_t(x_0, y_0)$, based on the calculated M types of color differences correlation related values.

* * * * *